(12) United States Patent
Agam et al.

(10) Patent No.: US 11,714,897 B2
(45) Date of Patent: Aug. 1, 2023

(54) SECURE DISTRIBUTED EXECUTION OF JOBS

(71) Applicant: Mobileye Vision Technologies Ltd., Jerusalem (IL)

(72) Inventors: Oren Agam, Zichron Ya'akov (IL); Liron Kuch, Haifa (IL); Eran Galil, Ramat Yishai (IL); Liron Atedgi, Ramat Gan (IL)

(73) Assignee: Mobileye Vision Technologies Ltd., Jerusalem (IL)

(*) Notice: Subject to any disclaimer, the term of this patent is extended or adjusted under 35 U.S.C. 154(b) by 147 days.

(21) Appl. No.: 17/406,815

(22) Filed: Aug. 19, 2021

(65) Prior Publication Data
US 2022/0067148 A1 Mar. 3, 2022

Related U.S. Application Data

(60) Provisional application No. 63/073,647, filed on Sep. 2, 2020.

(51) Int. Cl.
*G06F 21/00* (2013.01)
*G06F 21/54* (2013.01)
(Continued)

(52) U.S. Cl.
CPC .......... *G06F 21/54* (2013.01); *G06F 9/4403* (2013.01); *G06F 9/4881* (2013.01); *G06F 2221/034* (2013.01)

(58) Field of Classification Search
None
See application file for complete search history.

(56) References Cited

U.S. PATENT DOCUMENTS

| 5,404,450 A | 4/1995 | Szczepanek et al. |
| 6,996,822 B1 | 2/2006 | Willen et al. |

(Continued)

FOREIGN PATENT DOCUMENTS

| CN | 114194203 | 3/2022 |
| DE | 102021122658 | 3/2022 |

(Continued)

OTHER PUBLICATIONS

Sun, He et al. Reliable and Trustworthy Memory Acquisition on Smartphones. IEEE Transactions on Information Forensics and Security, vol. 10, Issue: 12. https://ieeexplore.ieee.org/stamp/stamp.jsp?tp=&arnumber=7185414 (Year: 2015).*

(Continued)

*Primary Examiner* — Jeremiah L Avery
(74) *Attorney, Agent, or Firm* — Schwegman Lundberg & Woessner, P.A.

(57) ABSTRACT

A processing unit, where the processing unit one of a group of processing units of a system, includes a processor; and memory including instructions, which when executed by the processor while avoiding interrupting a controller that does not belong to the group of processing units, cause the processor to: perform at least one iteration of the steps of: (a) entering a trusted mode, (b) selecting a selected job to be executed by the processing unit, (c) retrieving access control metadata related to the selected job, (d) entering, by the processing unit, an untrusted mode, (e) executing the selected job by the processing unit while adhering to the access control metadata related to the job, and (f) resetting the processing unit.

25 Claims, 14 Drawing Sheets

(51) Int. Cl.
*G06F 9/48* (2006.01)
*G06F 9/4401* (2018.01)

(56) References Cited

U.S. PATENT DOCUMENTS

| | | | | |
|---|---|---|---|---|
| 2014/0298091 | A1* | 10/2014 | Carlen | G06F 9/54 714/15 |
| 2015/0046625 | A1* | 2/2015 | Peddle | G11C 14/0018 710/308 |
| 2017/0085962 | A1* | 3/2017 | Maughan | H04N 21/25883 |
| 2017/0177368 | A1* | 6/2017 | DeHon | G06F 12/1458 |
| 2017/0206030 | A1* | 7/2017 | Woo | G06F 12/1408 |
| 2019/0095357 | A1* | 3/2019 | Ozsoy | G06F 12/1441 |
| 2019/0205244 | A1* | 7/2019 | Smith | G06F 3/065 |
| 2019/0213322 | A1* | 7/2019 | Dehon | G06F 9/4401 |
| 2019/0243683 | A1 | 8/2019 | Botelho | |

FOREIGN PATENT DOCUMENTS

| | | |
|---|---|---|
| EP | 3309677 | 4/2018 |
| GB | 2599789 B | 11/2022 |
| NL | 2029109 | 7/2022 |
| WO | 2013171362 | 11/2013 |

OTHER PUBLICATIONS

Malenko, Maja; Baunach, Marcel. Device Driverand System Call Isolation in Embedded Devices. 2019 22nd Euromicro Conference on Digital System Design (DSD). https://ieeexplore.ieee.org/stamp/stamp.jsp?tp=&arnumber=8875063 (Year: 2019).*
"United Kingdom Application Serial No. 2213719.4, Combined Search and Examination Report dated Sep. 28, 2022", 4 pgs.
"Netherlands Application Serial No. 2029109, Search Report dated May 4, 2022", w English translation, 9 pgs.
"United Kingdom Application Serial No. 2112475.5, Search Report dated Feb. 3, 2022", 4 pgs.

* cited by examiner

SECURE DISTRIBUTED EXECUTION OF JOBS

PRIORITY

This application claims the benefit of priority to U.S. Provisional Patent Application Ser. No. 63/073,647, filed Sep. 2, 2020, which is incorporated by reference herein in its entirety.

BACKGROUND

Advanced driver assistance systems (ADAS), and autonomous vehicle (AV) systems use cameras and other sensors together with object classifiers, which are designed to detect specific objects in an environment of a vehicle navigating a road. Object classifiers are designed to detect predefined objects and are used within ADAS and AV systems to control the vehicle or alert a driver based on the type of object that is detected its location, etc.

As ADAS and AV systems progress towards fully autonomous operation, it would be beneficial to protect data generated by these systems.

SUMMARY

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples.

Disclosed embodiments provide systems and methods that can be used as part of or in combination with autonomous navigation/driving and/or driver assist technology features. Driver assist technology refers to any suitable technology to assist drivers in the navigation and/or control of their vehicles, such as forward collision warning (FCW), lane departure warning (LDW) and traffic sign recognition (TSR), as opposed to fully autonomous driving. In various embodiments, the system may include one, two or more cameras mountable in a vehicle and an associated processor that monitor the environment of the vehicle. In further embodiments, additional types of sensors can be mounted in the vehicle and can be used in the autonomous navigation and/or driver assist system. In some examples of the presently disclosed subject matter, the system may provide techniques for processing images of an environment ahead of a vehicle navigating a road for training a neural networks or deep learning algorithms to estimate a future path of a vehicle based on images. In yet further examples of the presently disclosed subject matter, the system may provide techniques for processing images of an environment ahead of a vehicle navigating a road using a trained neural network to estimate a future path of the vehicle.

There are provided systems, methods, as illustrated in the claims and the specification.

Any combination of any subject matter of any claim may be provided.

Any combination of any method and/or method step disclosed in any figure and/or in the specification may be provided.

Any combination of any unit, device, and/or component disclosed in any figure and/or in the specification may be provided. Non-limiting examples of such units include a gather unit, an image processor and the like.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
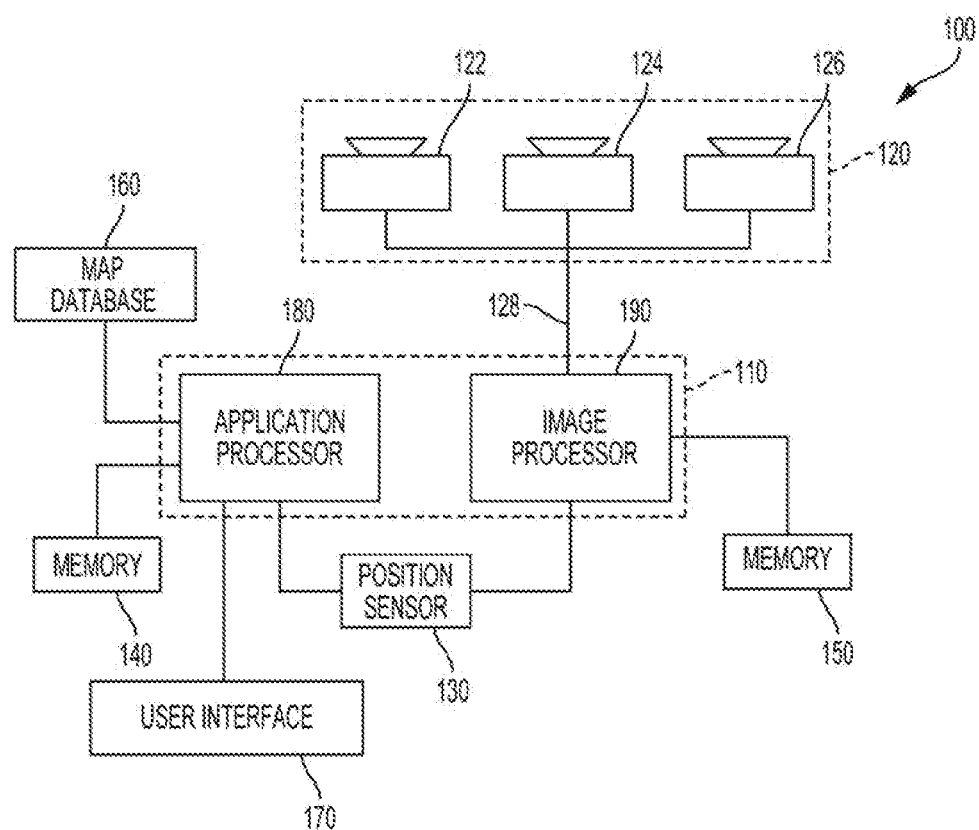
FIG. 1 is a block diagram representation of a system consistent with the disclosed embodiments.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by the memory device and should be applied mutatis mutandis to a non-transitory computer readable medium that stores instructions that may be executed by the memory device. For example, there may be provided a method and/or method steps executed by the image processor described in any one of claims. For example, there may be provided a method and/or method steps executed by the image processor described in any one of claims Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

A pixel may be a picture element obtained by a camera.

Before discussing in detail examples of features of the processing images of an environment ahead of a vehicle navigating a road for training a neural networks or deep learning algorithms to estimate a future path of a vehicle based on images or feature of the processing of images of an environment ahead of a vehicle navigating a road using a trained neural network to estimate a future path of the vehicle, there is provided a description of various possible implementations and configurations of a vehicle mountable system that can be used for carrying out and implementing the methods according to examples of the presently disclosed subject matter. In some embodiments, various examples of the system can be mounted in a vehicle, and can be operated while the vehicle is in motion. In some embodiments, the system can implement the methods according to examples of the presently disclosed subject matter.

However, it would be appreciated that embodiments of the present disclosure are not limited to scenarios where a suspected upright object indication is caused by a high-grade road. The suspected upright object indication can be associated with various other circumstances, and can result from other types of image data and also from data that is not image based or is not exclusively image based, as well.

FIG. 1, to which reference is now made, is a block diagram representation of a system consistent with the disclosed embodiments. System 100 can include various components depending on the requirements of a particular implementation. In some examples, system 100 can include a processing unit 110, an image acquisition unit 120 and one or more memory units 140, 150. Processing unit 110 can include one or more processing devices. In some embodiments, processing unit 110 can include an application processor 180, an image processor 190, or any other suitable processing device. Similarly, image acquisition unit 120 can include any number of image acquisition unit s and components depending on the requirements of a particular application. In some embodiments, image acquisition unit 120 can include one or more image capture devices (e.g., cameras), such as image capture device 122, image capture device 124, and image capture device 126. In some embodiments, system 100 can also include a data interface 128 communicatively connecting processing unit 110 to image acquisition unit 120. For example, data interface 128 can include any wired and/or wireless link or links for transmitting image data acquired by image acquisition unit 120 to processing unit 110.

Both application processor 180 and image processor 190 can include various types of processing devices. For example, either or both of application processor 180 and image processor 190 can include one or more microprocessors, preprocessors (such as image preprocessors), graphics processors, central processing units (CPUs), support circuits, digital signal processors, integrated circuits, memory, or any other types of devices suitable for running applications and for image processing and analysis. In some embodiments, application processor 180 and/or image processor 190 can include any type of single or multi-core processor, mobile device microcontroller, central processing unit, etc. Various processing devices can be used, including, for example, processors available from manufacturers such as Intel®, AMD®, etc. and can include various architectures (e.g., x86 processor, ARM®, etc.).

In some embodiments, application processor 180 and/or image processor 190 can include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third-generation processor and is six times more powerful that the EyeQ2®, may be used in the disclosed examples. In yet another example, the EyeQ4®, the fourth-generation processor, may be used in the disclosed examples.

While FIG. 1 depicts two separate processing devices included in processing unit 110, more or fewer processing devices can be used. For example, in some examples, a single processing device may be used to accomplish the tasks of application processor 180 and image processor 190. In other embodiments, these tasks can be performed by more than two processing devices.

Processing unit 110 can include various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor can include a video processor for capturing, digitizing, and processing the imagery from the image sensors. The CPU can include any number of microcontrollers or microprocessors. The support circuits can be any number of circuits generally well known in the art, including cache, power supply, clock, and input-output circuits. The memory can store software that, when executed by the processor, controls the operation of the system. The memory can include databases and image processing software, including a trained system, such as a neural network, for example. The memory can include any number of random access memories, read only memories, flash memories, disk drives, optical storage, removable storage, and other types of storage. In one instance, the memory can be separate from the processing unit 110. In another instance, the memory can be integrated into the processing unit 110.

Each memory 140, 150 can include software instructions that when executed by a processor (e.g., application processor 180 and/or image processor 190), can control operation of various aspects of system 100. These memory units can include various databases and image processing software. The memory units can include random access memory, read only memory, flash memory, disk drives, optical storage, tape storage, removable storage, and/or any other types of storage. In some examples, memory units 140, 150 can be separate from the application processor 180 and/or image processor 190. In other embodiments, these memory units can be integrated into application processor 180 and/or image processor 190.

In some embodiments, the system can include a position sensor 130. The position sensor 130 can include any type of device suitable for determining a location associated with at least one component of system 100. In some embodiments, position sensor 130 can include a GPS receiver. Such receivers can determine a user position and velocity by processing signals broadcasted by global positioning system satellites. Position information from position sensor 130 can be made available to application processor 180 and/or image processor 190.

In some embodiments, the system 100 can be operatively connectible to various systems, devices and units onboard a vehicle in which the system 100 can be mounted, and through any suitable interfaces (e.g., a communication bus) the system 100 can communicate with the vehicle's systems. Examples of vehicle systems with which the system 100 can cooperate include: a throttling system, a braking system, and a steering system.

In some embodiments, the system 100 can include a user interface 170. User interface 170 can include any device suitable for providing information to or for receiving inputs from one or more users of system 100, including, for example, a touchscreen, microphone, keyboard, pointer devices, track wheels, cameras, knobs, buttons, etc. Information can be provided by the system 100, through the user interface 170, to the user.

In some embodiments, the system 100 can include a map database 160. The map database 160 can include any type of database for storing digital map data. In some examples, map database 160 can include data relating to a position, in a reference coordinate system, of various items, including roads, water features, geographic features, points of interest, etc. Map database 160 can store not only the locations of such items, but also descriptors relating to those items, including, for example, names associated with any of the stored features and other information about them. For example, locations and types of known obstacles can be included in the database, information about a topography of a road or a grade of certain points along a road, etc. In some embodiments, map database 160 can be physically located with other components of system 100. Alternatively or additionally, map database 160 or a portion thereof can be located remotely with respect to other components of system 100 (e.g., processing unit 110). In such embodiments, information from map database 160 can be downloaded over a wired or wireless data connection to a network (e.g., over a cellular network and/or the Internet, etc.).

Image capture devices 122, 124, and 126 can each include any type of device suitable for capturing at least one image from an environment. Moreover, any number of image capture devices can be used to acquire images for input to the image processor. Some examples of the presently disclosed subject matter can include or can be implemented with only a single-image capture device, while other examples can include or can be implemented with two, three, or even four or more image capture devices. Image capture devices 122, 124, and 126 will be further described with reference to FIGS. 2B-2E, below.

It would be appreciated that the system 100 can include or can be operatively associated with other types of sensors, including for example: an acoustic sensor, a RF sensor (e.g., radar transceiver), a LIDAR sensor. Such sensors can be used independently of or in cooperation with the image acquisition unit 120. For example, the data from the radar system (not shown) can be used for validating the processed information that is received from processing images acquired by the image acquisition unit 120, e.g., to filter certain false positives resulting from processing images acquired by the image acquisition unit 120, or it can be combined with or otherwise compliment the image data from the image acquisition unit 120, or some processed variation or derivative of the image data from the image acquisition unit 120.

Figure 2A:
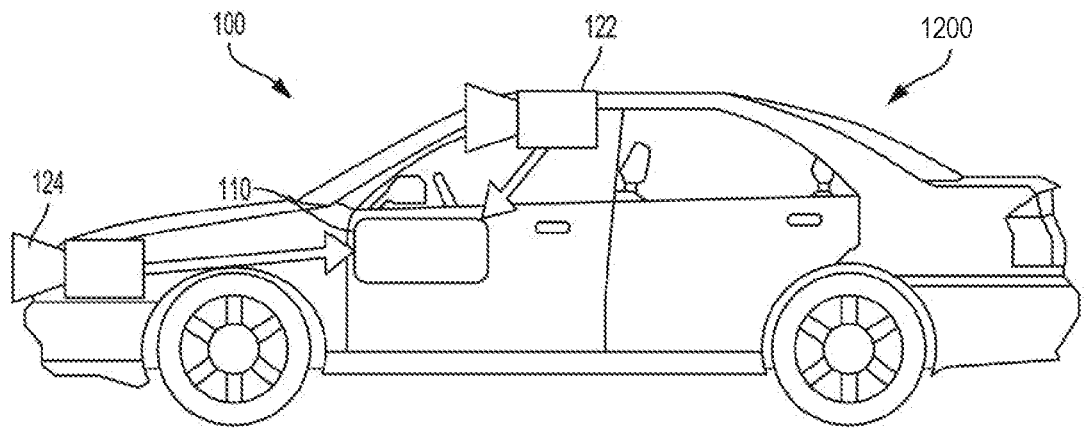
FIG. 2A is a diagrammatic side view representation of an exemplary vehicle including a system consistent with the disclosed embodiments.

System 100, or various components thereof, can be incorporated into various different platforms. In some embodiments, system 100 may be included on a vehicle 1200, as shown in FIG. 2A. For example, vehicle 1200 can be equipped with a processing unit 110 and any of the other components of system 100, as described above relative to FIG. 1. While in some embodiments vehicle 1200 can be equipped with only a single-image capture device (e.g., camera), in other embodiments, such as those discussed in connection with FIGS. 2B-2E, multiple image capture devices can be used. For example, either of image capture devices 122 and 124 of vehicle 1200, as shown in FIG. 2A, can be part of an ADAS (Advanced Driver Assistance Systems) imaging set.

The image capture devices included on vehicle 1200 as part of the image acquisition unit 120 can be positioned at any suitable location. In some embodiments, as shown in FIGS. 2A-2E and 3, image capture device 122 can be located in the vicinity of the rearview mirror. This position may provide a line of sight similar to that of the driver of vehicle 1200, which can aid in determining what is and is not visible to the driver.

Other locations for the image capture devices of image acquisition unit 120 can also be used. For example, image capture device 124 can be located on or in a bumper of vehicle 1200. Such a location can be especially suitable for image capture devices having a wide field of view. The line of sight of bumper-located image capture devices can be different from that of the driver. The image capture devices (e.g., image capture devices 122, 124, and 126) can also be located in other locations. For example, the image capture devices may be located on or in one or both of the side mirrors of vehicle 1200, on the roof of vehicle 1200, on the hood of vehicle 1200, on the trunk of vehicle 1200, on the sides of vehicle 1200, mounted on, positioned behind, or positioned in front of any of the windows of vehicle 1200, and mounted in or near light figures on the front and/or back of vehicle 1200, etc. The image capture unit 120, or an image capture device that is one of a plurality of image capture devices that are used in an image capture unit 120, can have a field-of-view (FOV) that is different than the FOV of a driver of a vehicle, and not always see the same objects. In one example, the FOV of the image acquisition unit 120 can extend beyond the FOV of a typical driver and can thus image objects which are outside the FOV of the driver. In yet another example, the FOV of the image acquisition unit 120 is some portion of the FOV of the driver. In some embodiments, the FOV of the image acquisition unit 120 corresponding to a sector which covers an area of a road ahead of a vehicle and possibly also surroundings of the road.

In addition to image capture devices, vehicle 1200 can be include various other components of system 100. For example, processing unit 110 may be included on vehicle 1200 either integrated with or separate from an engine control unit (ECU) of the vehicle. Vehicle 1200 may also be equipped with a position sensor 130, such as a GPS receiver and may also include a map database 160 and memory units 140 and 150.

Figure 2B:
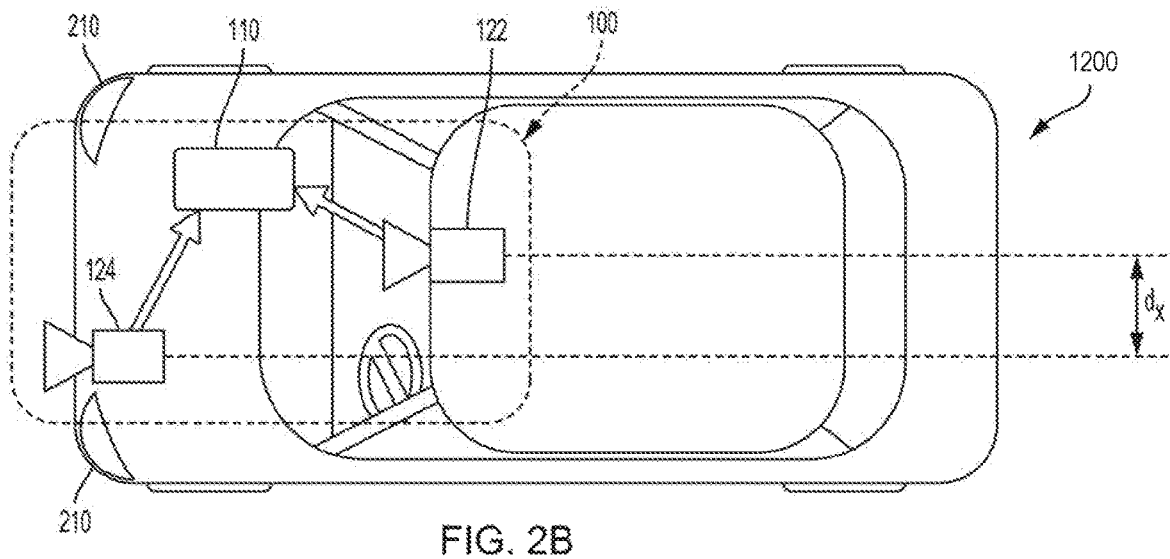
FIG. 2B is a diagrammatic top view representation of the vehicle and system shown in FIG. 2A consistent with the disclosed embodiments.

FIG. 2A is a diagrammatic side view representation of a vehicle imaging system according to examples of the presently disclosed subject matter. FIG. 2B is a diagrammatic top view illustration of the example shown in FIG. 2A. As illustrated in FIG. 2B, the disclosed examples can include a vehicle 1200 including in its body a system 100 with a first image capture device 122 positioned in the vicinity of the rearview mirror and/or near the driver of vehicle 1200, a second image capture device 124 positioned on or in a bumper region (e.g., one of bumper regions 1210) of vehicle 1200, and a processing unit 110.

Figure 2C:
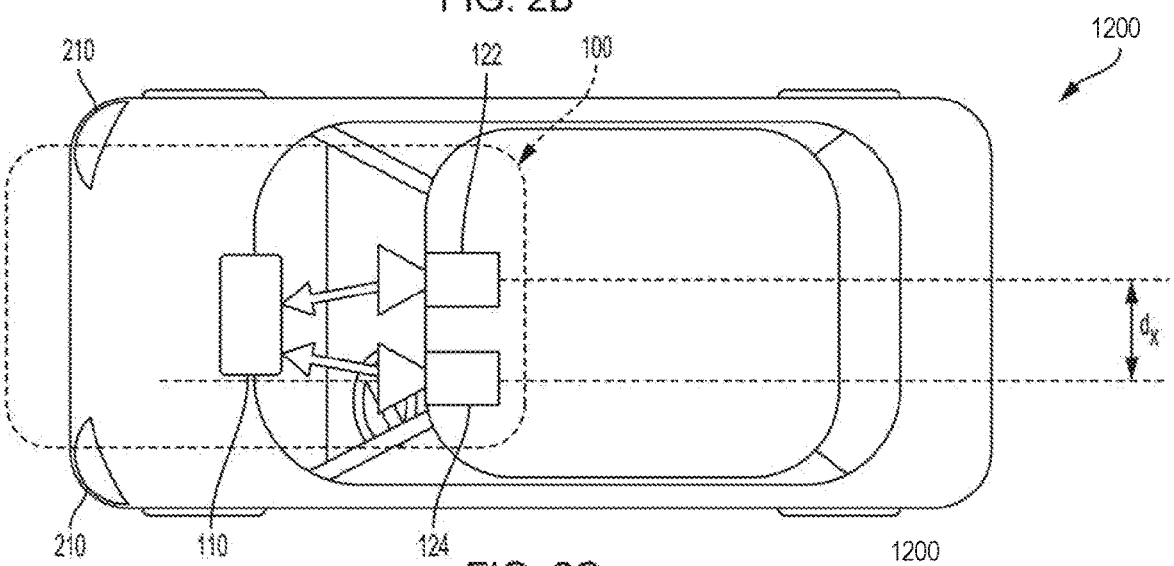
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 1200. Additionally, while two image capture devices 122 and 124 are shown in FIGS. 2B and 2C, it should be understood that other embodiments may include more than two image capture devices. For example, in the embodiment shown in FIG. 2D, first, second, and third image capture devices 122, 124, and 126, are included in the system 100 of vehicle 200.

Figure 2D:
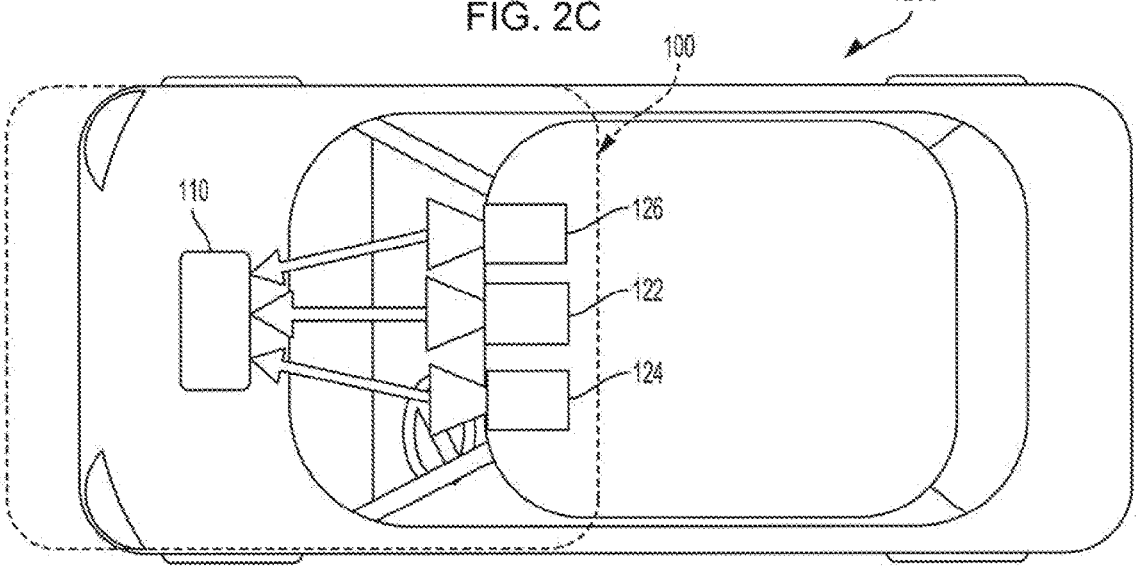
FIG. 2D is a diagrammatic top view representation of yet another embodiment of a vehicle including a system consistent with the disclosed embodiments.

As shown in FIG. 2D, image capture devices 122, 124, and 126 may be positioned in the vicinity of the rearview mirror and/or near the driver seat of vehicle 1200. The disclosed examples are not limited to any particular number and configuration of the image capture devices, and the image capture devices may be positioned in any appropriate location within and/or on vehicle 1200.

It is also to be understood that disclosed embodiments are not limited to a particular type of vehicle 1200 and may be applicable to all types of vehicles including automobiles, trucks, trailers, motorcycles, bicycles, self-balancing transport devices and other types of vehicles.

The first image capture device 122 can include any suitable type of image capture device. Image capture device 122 can include an optical axis. In one instance, the image capture device 122 can include an Aptina M9V024 WVGA sensor with a global shutter. In another example, a rolling shutter sensor can be used. Image acquisition unit 120, and any image capture device which is implemented as part of the image acquisition unit 120, can have any desired image resolution. For example, image capture device 122 can provide a resolution of 1280×960 pixels and can include a rolling shutter.

Image acquisition unit 120, and any image capture device which is implemented as part of the image acquisition unit 120, can include various optical elements. In some embodiments one or more lenses can be included, for example, to provide a desired focal length and field of view for the image acquisition unit 120, and for any image capture device which is implemented as part of the image acquisition unit 120. In some examples, an image capture device which is implemented as part of the image acquisition unit 120 can include or be associated with any optical elements, such as a 6 mm lens or a 12 mm lens, for example. In some examples, image capture device 122 can be configured to capture images having a desired (and known) field-of-view (FOV).

The first image capture device 122 may have a scan rate associated with acquisition of each of the first series of image scan lines. The scan rate may refer to a rate at which an image sensor can acquire image data associated with each pixel included in a particular scan line.

Figure 2E:
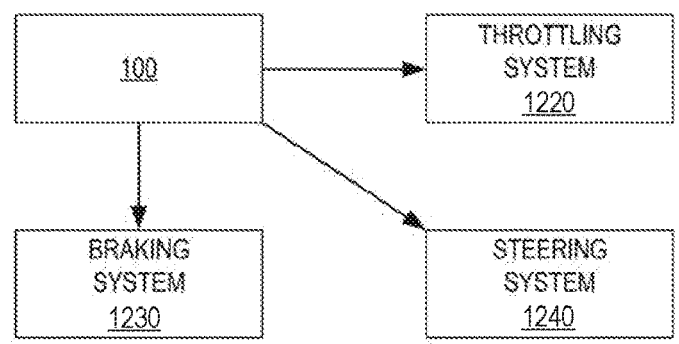
FIG. 2E is a diagrammatic representation of exemplary vehicle control systems consistent with the disclosed embodiments.

FIG. 2E is a diagrammatic representation of vehicle control systems, according to examples of the presently disclosed subject matter. As indicated in FIG. 2E, vehicle 1200 can include throttling system 1220, braking system 1230, and steering system 1240. System 100 can provide inputs (e.g., control signals) to one or more of throttling system 1220, braking system 1230, and steering system 1240 over one or more data links (e.g., any wired and/or wireless link or links for transmitting data). For example, based on analysis of images acquired by image capture devices 122, 124, and/or 126, system 100 can provide control signals to one or more of throttling system 1220, braking system 1230, and steering system 1240 to navigate vehicle 1200 (e.g., by causing an acceleration, a turn, a lane shift, etc.). Further, system 100 can receive inputs from one or more of throttling system 1220, braking system 1230, and steering system 1240 indicating operating conditions of vehicle 1200 (e.g., speed, whether vehicle 1200 is braking and/or turning, etc.).

Figure 3:
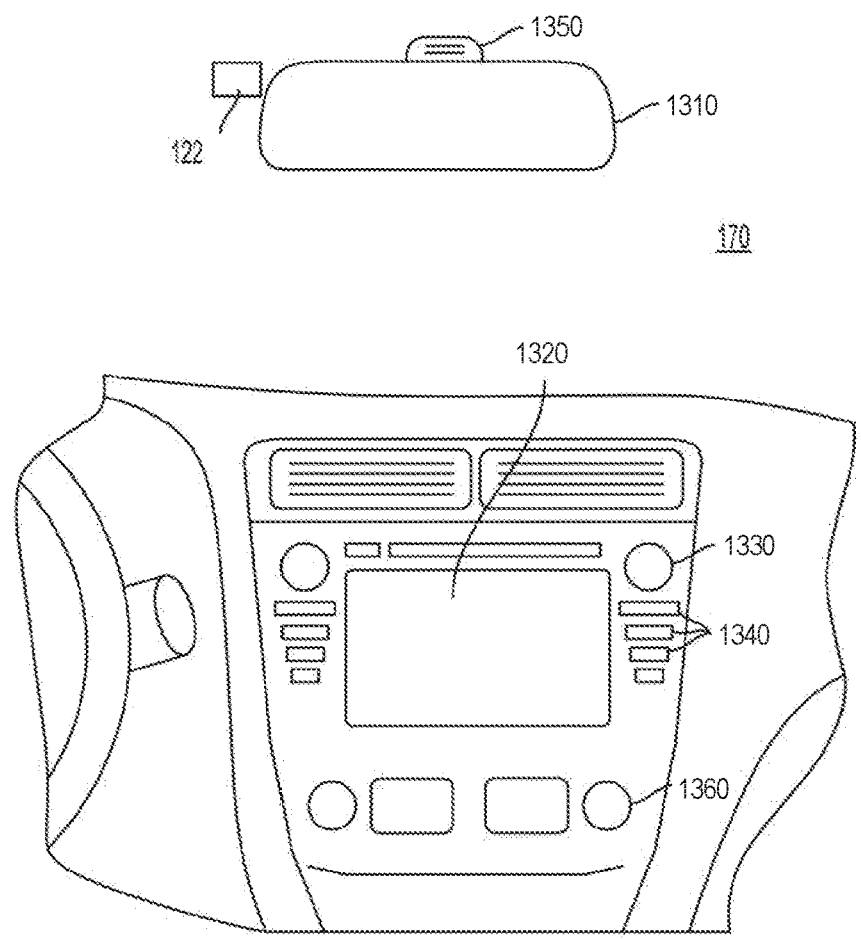
FIG. 3 is a diagrammatic representation of an interior of a vehicle including a rearview mirror and a user interface for a vehicle imaging system consistent with the disclosed embodiments.

As shown in FIG. 3, vehicle 1200 may also include a user interface 170 for interacting with a driver or a passenger of vehicle 1200. For example, user interface 170 in a vehicle application may include a touch screen 1320, knobs 1330, buttons 1340, and a microphone 1350. A driver or passenger of vehicle 1200 may also use handles (e.g., located on or near the steering column of vehicle 1200 including, for example, turn signal handles), buttons (e.g., located on the steering wheel of vehicle 1200), and the like, to interact with system 100. In some embodiments, microphone 1350 may be positioned adjacent to a rearview mirror 1310. Similarly, in some embodiments, image capture device 122 may be located near rearview mirror 1310. In some embodiments, user interface 170 may also include one or more speakers 1360 (e.g., speakers of a vehicle audio system). For example, system 100 may provide various notifications (e.g., alerts) via speakers 1360.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 1200 and, in response to this analysis, navigate and/or otherwise control and/or operate vehicle 1200. Navigation, control, and/or operation of vehicle 1200 may include enabling and/or disabling (directly or via intermediary controllers, such as the controllers mentioned above) various features, components, devices, modes, systems, and/or subsystems associated with vehicle 1200. Navigation, control, and/or operation may alternately or additionally include interaction with a user, driver, passenger, passerby, and/or other vehicle or user, which may be located inside or outside vehicle 1200, for example by providing visual, audio, haptic, and/or other sensory alerts and/or indications.

As discussed below in further detail and consistent with various disclosed embodiments, system 100 may provide a variety of features related to autonomous driving, semi-autonomous driving and/or driver assist technology. For example, system 100 may analyze image data, position data (e.g., GPS location information), map data, speed data, and/or data from sensors included in vehicle 1200. System 100 may collect the data for analysis from, for example, image acquisition unit 120, position sensor 130, and other sensors. Further, system 100 may analyze the collected data to determine whether or not vehicle 1200 should take a certain action, and then automatically take the determined action without human intervention. It would be appreciated that in some cases, the actions taken automatically by the vehicle are under human supervision, and the ability of the human to intervene adjust abort or override the machine action is enabled under certain circumstances or at all times. For example, when vehicle 1200 navigates without human intervention, system 100 may automatically control the braking, acceleration, and/or steering of vehicle 1200 (e.g., by sending control signals to one or more of throttling system 1220, braking system 1230, and steering system 1240). Further, system 100 may analyze the collected data and issue warnings, indications, recommendations, alerts, or instructions to a driver, passenger, user, or other person inside or outside of the vehicle (or to other vehicles) based on the analysis of the collected data. Additional details regarding the various embodiments that are provided by system 100 are provided below.

Any value illustrated in the specification is a non-limiting example of a number of values. Other values may be provided—values that may be lower than the value mentioned in the application and/or values that exceed the value mentioned in the application.

Systems that include multiple processing units usually execute multiple processes, whereas each process may include a plurality of jobs. The efficient execution of the multiple processes requires a dynamic allocation of the jobs between the multiple processing units.

A processing unit may be a hardware accelerator, a general purpose unit, a central processing unit (CPU), a system on chip (SOC), an image processor, a graphic processing unit (GPU), a field programmable gate array (FPGA), an application specific integrated circuit (ASIC), a neural network processor, and the like.

The processing units may share memory resources, but a processing unit that executes a job of a certain process may corrupt data related to another process by writing to memory resources allocated to another process.

In order to prevent the data corruption, access control metadata that is associated with each process has to be uploaded to each processing unit before an execution of a job related to the process.

The management of the multiple processing units, and especially the loading of the access control metadata is a burdensome task, may also be highly complex and may require a dedicated controller for scheduling the execution of different jobs by the processing units.

The dedicated controller is usually interrupted when a processing unit completes a job, and once interrupted, the dedicated controller has to determine the next job to be executed by the processing unit. Once determined, the dedicated controller has to set the access control metadata that is associated with the job.

The dedicated controller may become a bottleneck that may reduce the throughput of the system—especially when the at least some of the processing units are relatively spaced apart from the dedicated controller.

There may be provided a distributed job allocation and execution scheme in which the processing units may execute jobs, and upload the process specific access control metadata in an autonomous manner or substantially autonomous manner—in the sense that the dedicated controller does not intervene or does not substantially intervene. The dedicated controller can be regarded as not intervening or not substantially intervening when during at least a majority of times that jobs are executed by the processing units—the dedicated controller is not interrupted.

The processing units may access job queues and select which job to execute. The processing units may upload (automatically or only when required) the process specific access control metadata without intervention of a dedicated controller.

The selection of a job may involve updating job metadata (for example which job is selected by a processing unit, whether a job was completed) without intervention of a dedicated controller.

A processing unit may allocate a job to another processing unit by updating job metadata.

The update of job metadata and/or the update of the access control unit should be executed in a secure manner that prevents corruption of the job metadata. Furthermore, the update of the job metadata should be done in a secure manner to prevent hacking.

There is provided a system, a method and a computer readable medium that enable a processing unit to perform sensitive operations. Sensitive operations include those that affect a job's execution or state. Examples of sensitive operations include those that create or modify job data or metadata, create or change job access control, or control job execution.

A sensitive operation may include selecting a job.

A sensitive operation may include updating job metadata.

A sensitive operation may include updating the access control metadata of the processing unit (prior to execution of a job).

A sensitive operation may include an allocation of a job to another processing unit.

A processing unit may be configured to perform one or more sensitive operations when the processing unit operates in a trusted mode. A sensitive operation may not be executed when the processing unit is in an untrusted mode.

A trusted mode is a mode in which a processing unit may execute sensitive operations. When in an untrusted mode the processing unit is not allowed to execute sensitive operations.

A processing unit may be configured to enter the trusted mode following a reset, and during boot process.

The processing unit may be configured to exit the trusted mode after completing the execution of one or more sensitive operations.

The processing unit may execute a job in an untrusted mode and then reset itself and return to the trusted mode.

Updating some job metadata such as counters and/or pointers can be done by using an atomic command execution unit.

The atomic command execution unit may implement locks, counters, barriers and interrupt aggregation that enables synchronization of multiple processing units. The atomic command execution unit may support other functions.

An atomic command executed by a certain thread is seen by other threads as happening instantaneously. An atomic command may include several commands that are linked to each other. For example, a read-modify-write atomic command may include a read command and a modify/write command.

The atomic command execution unit may be memory mapped in the sense that it can be accessed using addresses of one or more dedicated address ranges within an address space. The one or more dedicated address ranges are accessible to the processing units.

The atomic command execution unit may include (i) an interface that is configured to receive, from multiple processing units, multiple memory mapped atomic commands; and (ii) at least one circuit that is configured to successfully execute the atomic commands and generate output values without intervention from the multiple processing units even when a successful execution of an atomic command is preceded by a failure to execute the atomic command. The interface may be further configured to output completion indications regarding a completion of the atomic commands to the multiple processing units and/or return values.

Additionally or alternatively, the at least one more circuits of the atomic command execution unit may be configured to successfully execute the atomic commands and generate output values without intervention from multiple processing units; wherein successfully executing of the atomic commands may include repeating an execution of at least one atomic command until the at least one atomic command is successfully executed.

The terms "unit", "component", and "module" are used in an interchangeable manner.

Figure 4:
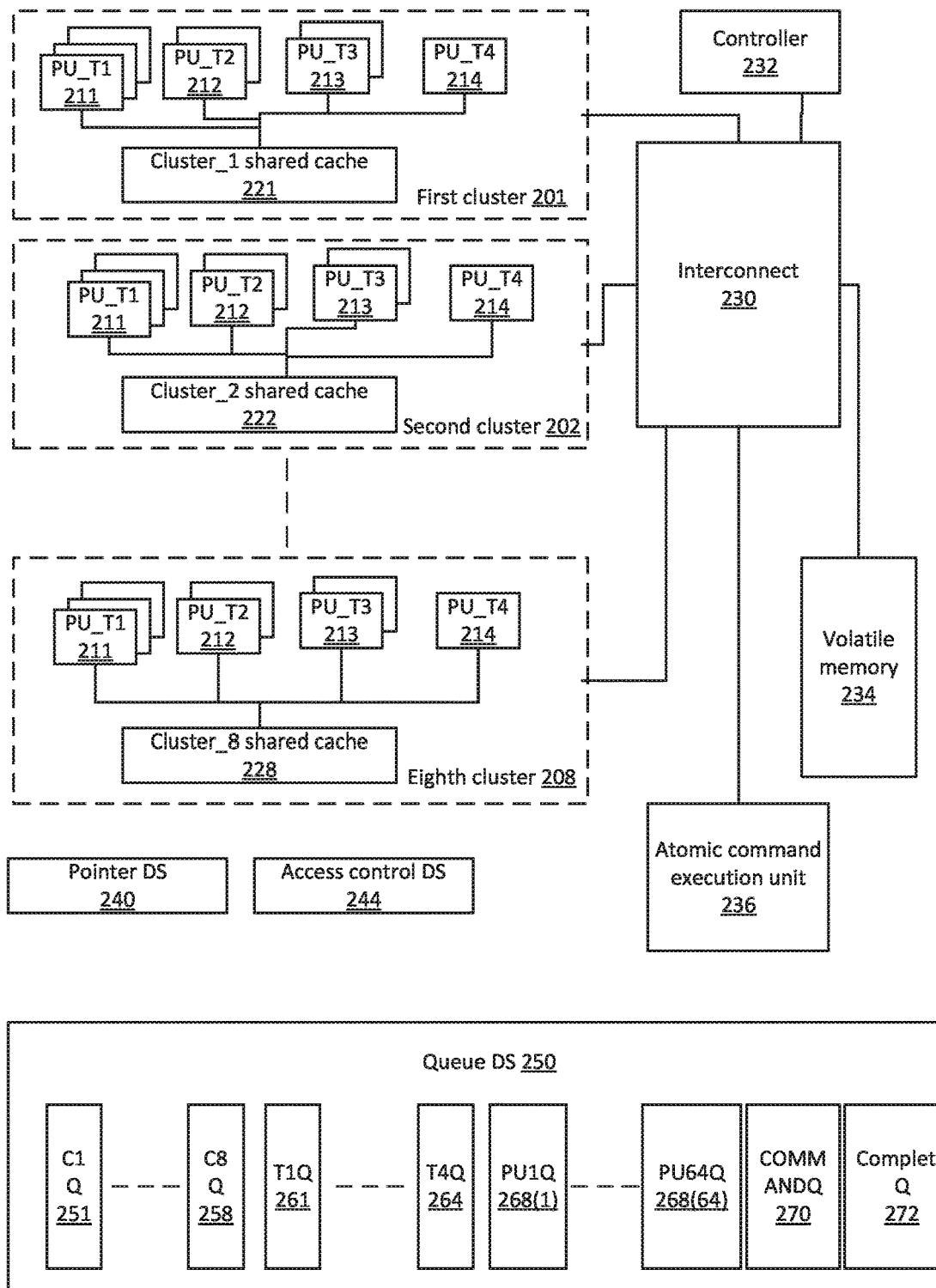
FIG. 4 illustrates an example of a system.

FIG. 4 illustrates an example of a system 200.

System 200 may be an integrated circuit, may include more than a single integrated circuit (e.g., two, three, . . . , n), may include components other than one or more integrated circuits, and the like.

In the example shown in FIG. 4, system 200 includes eight clusters 201-208 of processing units of four different types, where processing units of the same cluster share a shared cache.

The number of clusters may differ from eight. There may be fewer than four types of processing units or more than four types of processing units in each cluster. Additionally or alternatively, the processing units of a cluster may each have their own cache device. In another embodiment, a shared cache may be used among fewer than all of the processing units in a cluster. For instance, there may be eight processing units in a cluster with each pair sharing a cache, resulting in four caches in the cluster. The caches may be stored on the same memory device or on separate memory devices. It should be noted that a processing unit may or may not include a cache.

In the example shown in FIG. 4, each one of clusters 201-208 includes eight processing units, three of the first type (PU_T1 211), two of the second type (PU_T2 212), two of a third type (PU_T3 213) and one of a fourth type (PU_T4 214).

It should be noted that there may be any number of processing units per cluster, that there may be any type of processing units in a cluster, and that there may be any number of any type of processing unit in a cluster.

In FIG. 4 the clusters are illustrated as including the same number and types of processing units per cluster.

It should be noted that the clusters may differ from one another by the number of processing units, by the type of processing units and/or by the number of processing units per type.

The eight clusters are coupled to an interconnect 230. The interconnect 230 may be coupled to a controller 232, volatile memory 234, and atomic command execution unit 236. Any other combination of clusters and memory units of different types may be provided. There may be any number of memory units of any kind.

FIG. 4 also illustrates various data structures stored in the system. Parts of the data structures may be stored in any manner in any of the memory units illustrated in FIG. 4—or in any other manner.

The data structures may include a queue data structure (Queue DS) 250, access control data structure ("access control DS") 244, and pointer data structure ("pointer DS" 240).

Queue DS 250 may include any type of queues including, for example:
1) Queues allocated per a processing unit (such as sixty-four processing unit queues PU1Q-PU64Q 268(1)-268(64)—one per processing unit).
2) Queues allocated per a type from the different types of the processing units (such as four type queues T1Q-T4Q 261-264).
3) Queues allocated per cluster (such as eight cluster queues C1Q-C8Q 251-258).

It should be noted that any other arrangement of queues may be provided, that the number of processing unit queues may differ from 64 (it may be more or less), that the number of type queues may differ from four, that the number of cluster queue may differ from eight.

The access control DS 244 may store access control metadata for different processes. The access control metadata may define, for example, which queue may be accessed by a processing unit when executing a job of a process, and which other memory entries are available when executing a job related to a certain process.

The pointer DS 240 may store pointers to different queues. For example, the pointer DS 240 may maintain, per queue, a write pointer for writing the next job descriptor, and a read pointer for reading a next job descriptor from a queue. The pointer DS 240 may be managed by the atomic command execution unit 236, but may be managed in any other manner.

A processing unit of the system may be configured to perform at least one iteration (without interrupting a controller that belongs to the group), an iteration including the following operations: (a) enter a trusted mode, (b) select (from queue DS 250) a selected job, (c) retrieve (automatically or only when it is determined that the retrieval is required) from access control DS 244, access control metadata related to the selected job, (d) enter an untrusted mode, (e) execute the selected job while adhering to the access control metadata related to the job, and (e) reset.

Regarding step (b)—a processing unit may automatically retrieve the access control metadata related to the job during each boot sequence.

Alternatively, the processing unit may check whether the retrieval is required. This may include checking if a previously stored access control metadata (from a previous job) is relevant to the current job and if so, retrieval of the access control metadata can be skipped.

For example, the access control metadata may be process specific and when the processing unit executes a sequence of jobs that belong to the same process the processing unit may not need to retrieve the access control metadata more than once during the sequence and may thus skip the retrieval operation for any one or more jobs that are included in the same process.

The iterations are executed in an autonomous manner or a substantial autonomous manner—so that at least a majority of the iterations may be executed without interrupting a controller 232.

The initiation of the trusted mode may be activated during a boot process following a reset of the processing unit.

The multiple iterations may be executed by the processing unit autonomously—thus without intervention of the controller. The controller may allocate its resources to tasks other than intervening in the multiple iterations.

The execution of the selected job may be followed by reporting a completion of the selected job. This may be executed in various manners, for example by writing a completion identifier to completion queue "complete Q 272".

A processing unit may be configured to allocate an allocated job to another processing unit. The allocating may include updating, by the processing unit and while in the trusted mode, metadata related to an execution of the allocated job. For example—writing a job descriptor into a queue accessible by the other processing units. The selection of the other processing unit may be executed in any manner.

The updating of the metadata (related to the job allocation) may include updating a queue pointer, using an atomic command execution unit. This may involve executing an atomic read modify write command.

The updating of the metadata (related to the job allocation) may be executing during the execution of the selected job or following the execution of the selected job, but before the resetting of the first processing unit.

The updating of the metadata (related to the job allocation) may be executing during the execution of the selected job or following the execution of the selected job, but after the next resetting of the first processing unit The controller 232 may control the processing unit by sending control messages that control a mode of operation of the processing units. For example, allocating one or more processing units for executing rare but urgent jobs that are flagged in a manner that is identified by the processing unit, and the like. The controller 232 may be informed about a job that should be deemed rare and urgent. Alternatively, the controller may receive urgency information regarding the urgency of the job and may then determine the rarity of the job. A rate task may be, for example, a task that is executed less frequent (for example—by a factor of few tens till few hundreds—and even more) than a most frequency executed task. The control firmware executed by the processing unit may include searching for a command and if such command exist, the command is executed even when the execution involves entering an idle mode or otherwise delaying or preventing execution of further iterations of one or more steps (a)-(e).

A processing unit may be configured to retrieve, while in the trusted mode, one or more commands originated from the controller (for example retrieving from command queue ("COMMAND Q") 270. The retrieval is followed by execution of the commands.

Figure 5:
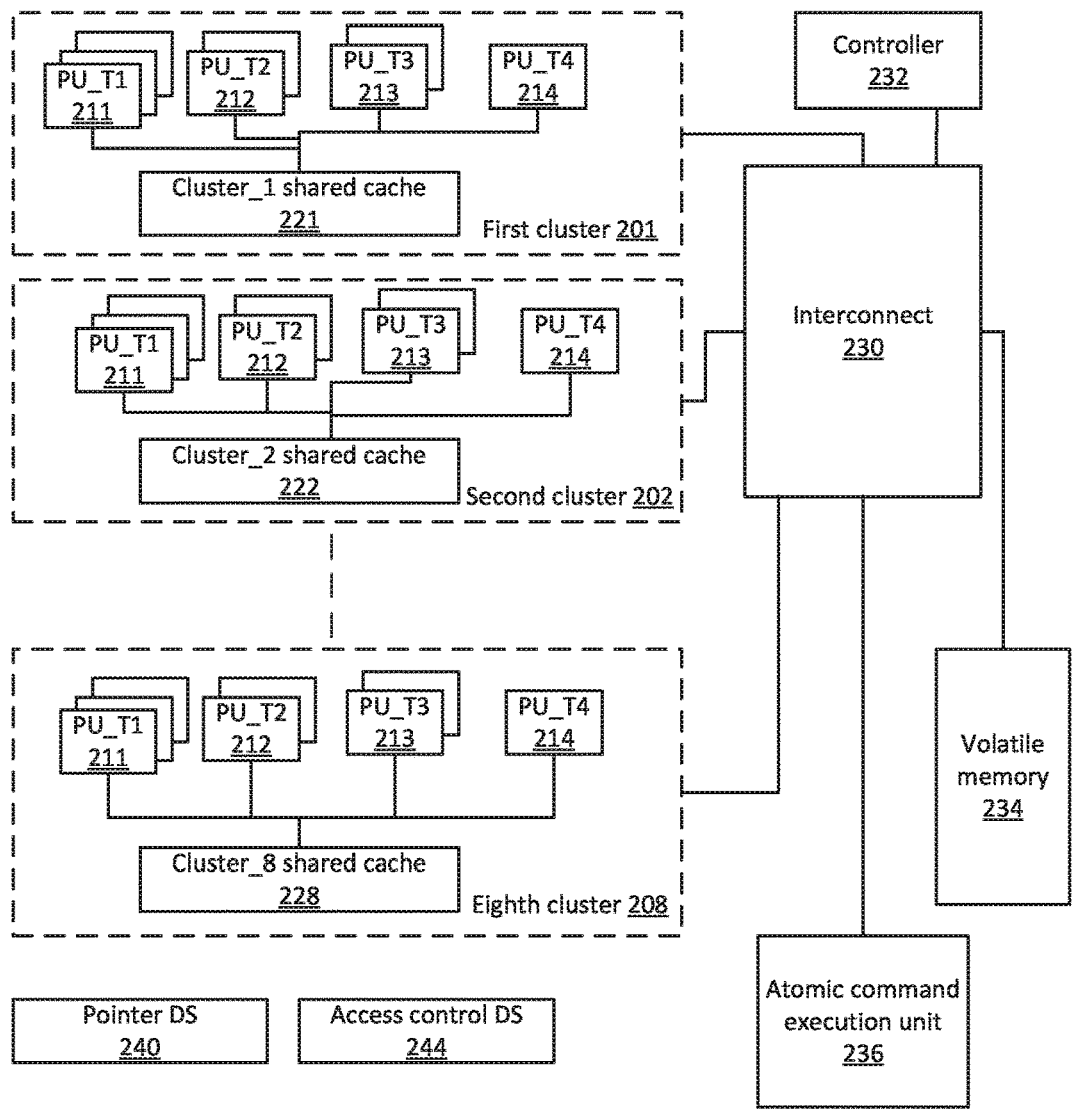
FIG. 5 illustrates an example of a system.
Figure 5:
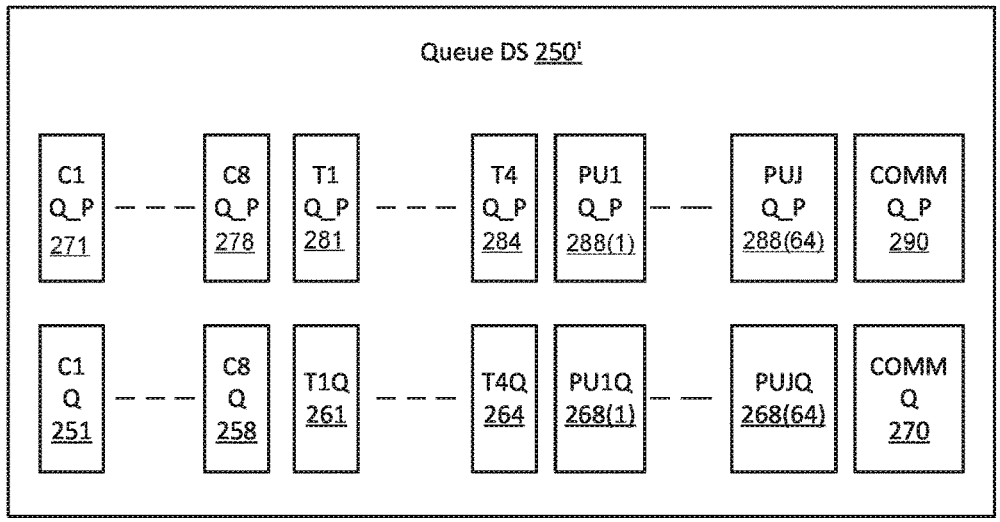

FIG. 5 illustrates an example of a system 200'.

System 200' differs from system 200 by including an additional set of queues in queue DS 250' that store priority levels (cluster priority queues 271-278, type priority queues 281-284, processing unit priority queues 288(1)-288(64) and command priority queue 290), where the priority levels may differ from each other.

There may be more than one set of priority queues for supporting more than one priority level.

Priority levels may be supported in other manners, for example by using a single queue for storing jobs of different levels and associating priority metadata with the job descriptors. This may reduce the number of queues but may complicate the selection of a job.

Any of the mentioned above systems may support or host user application, runtime code, drivers and the like.

For example, user applications may interact with the Runtime via the Runtime API to submit programs for execution on the processing units. The Runtime may interact with the user mode driver to submit a graph of jobs for processing. The Runtime may get notifications on job completions from the user mode driver.

A user mode driver may interact with the processing unit kernel mode driver to submit jobs for execution on the processing units.

The processing unit kernel mode driver may interact with a job queue, to enqueue jobs for execution by the control firmware.

A job may be associated with one or more attribute out of priority, cluster, processing unit and type. A job associated with one attribute only may be stored in a single queue associated with that attribute. A job associated with multiple attributes may be duplicated and stored in queues related to each one of the attributed. Alternatively, the job may be stored in a certain queue associated with one of the attributed and the system may maintain linking metadata that may link other queues associated with other attributes to that certain queue. The queues may be managed in any manner. Yet for another example, there may be provided a queue per a combination of attributes.

FIGS. 6-11 illustrate examples of control firmware (CF) executed by a processing unit.

Figure 6:
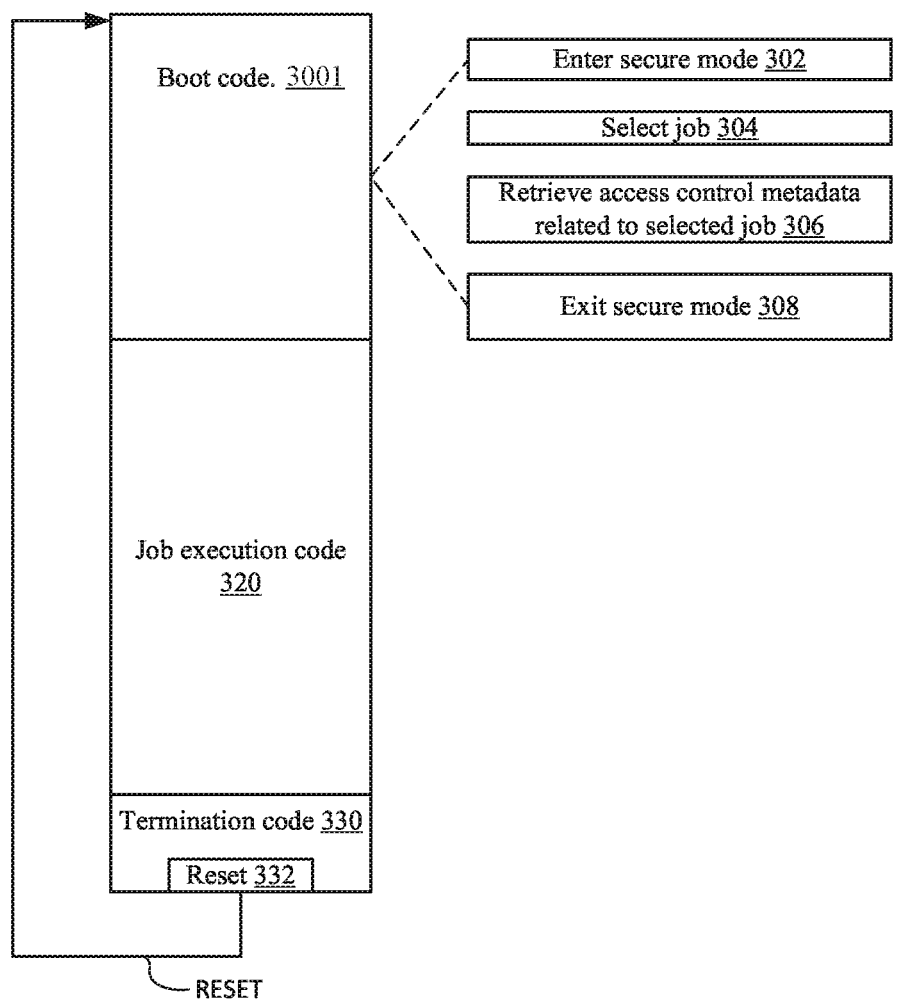
FIG. 6 is an example of a control firmware executed by a processing unit.

FIG. 6 illustrates an example of a CF 300(1) that begins with a boot code 3001, followed by job execution code 320, and ends with a termination code 330.

The boot code 3001 may include code 302 for entering a secure mode, code 304 for selecting a job, code 306 for retrieving access control metadata related to the selected job, and code 308 for exiting the secure mode.

The job execution code 320 includes code for executing the selected code while in an untrusted mode and while adhering to the access control metadata.

The termination code 330 may include a reset code 332 for resetting the processing unit. This will result in rebooting the processing unit.

Figure 7:
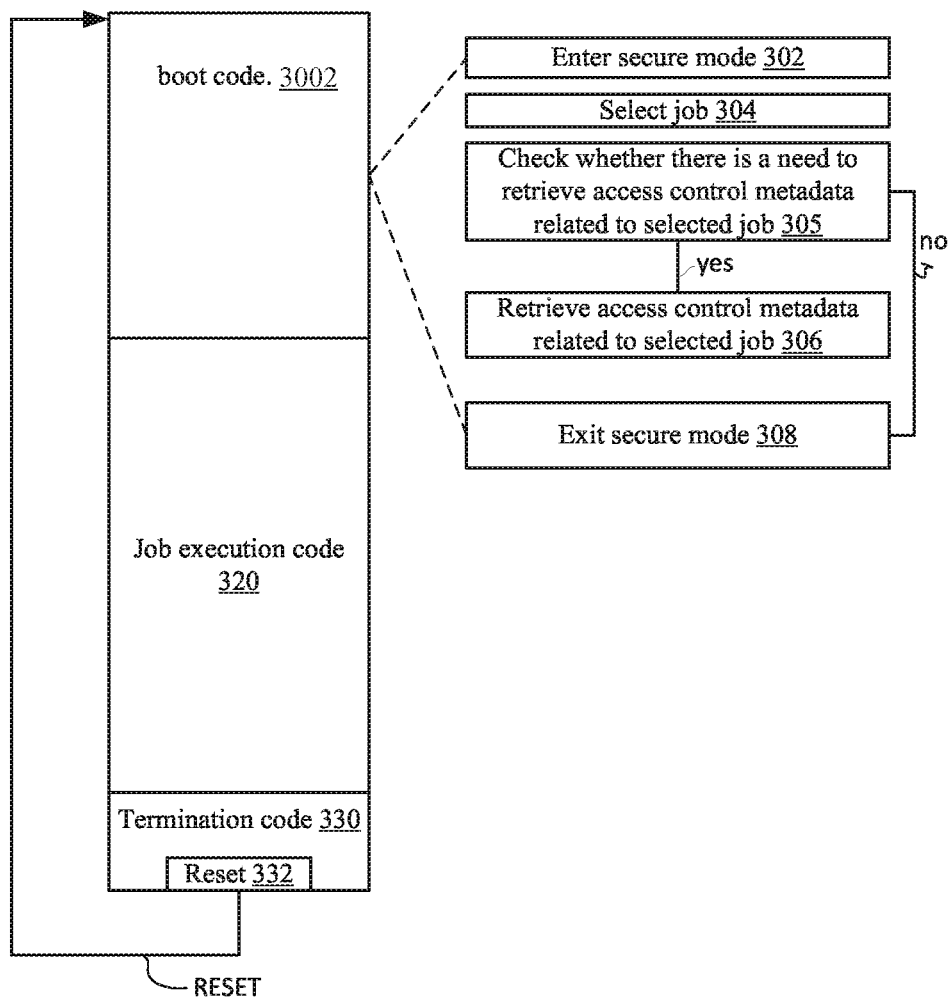
FIG. 7 is an example of a control firmware executed by a processing unit.

FIG. 7 illustrates an example of a CF 300(2) that begins with a boot code 3002, followed by job execution code 320, and ends with a termination code 330.

The boot code 3002 of CF 300(2) differs from the boot code 3001 of CF 300(1). The boot code of CF 300(2) includes code 305 for checking whether to retrieve the access control metadata related to the selected job.

Code 304 for selecting of the job is followed by code 305 for checking whether there is a need to retrieve access control metadata related to the selected job. If yes, then code 305 is followed by code 306 for retrieving access control metadata related to the selected job. If no, then code 305 is followed by code 308 for exiting the secure mode.

Figure 8:
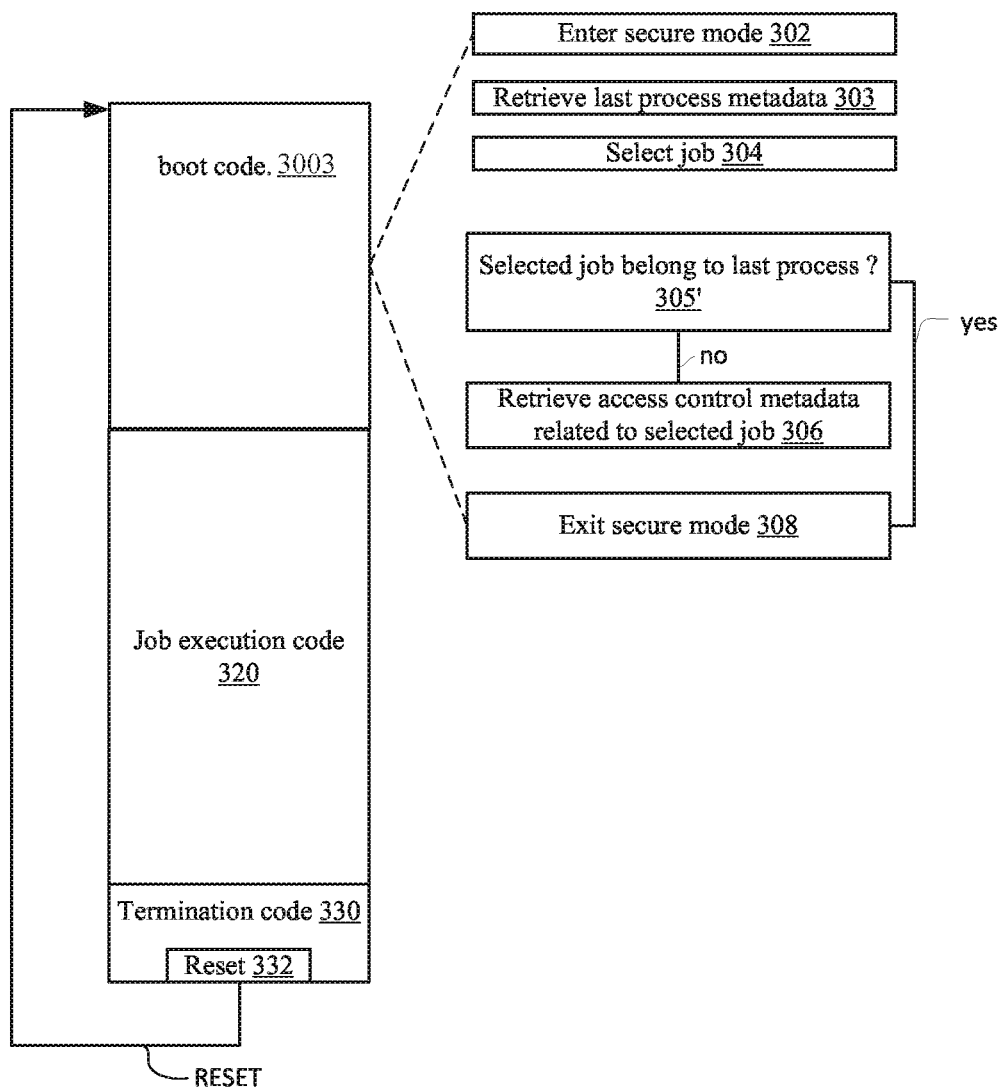
FIG. 8 is an example of a control firmware executed by a processing unit.

FIG. 8 illustrates an example of a CF 300(3) that starts by a boot code 3003, followed by job execution code 320, and ends in a termination code 330.

The boot code 3003 of CF 300(3) differs from the boot code 3001 of CF 300(1) by including code 305' for checking whether the selected job is the last process (last process is the process related to the last executed job).

If yes, then code 305' is followed by code 306 for retrieving access control metadata related to the selected job.

If no, then code 305' is followed by code 308 for exiting the secure mode.

Figure 9:
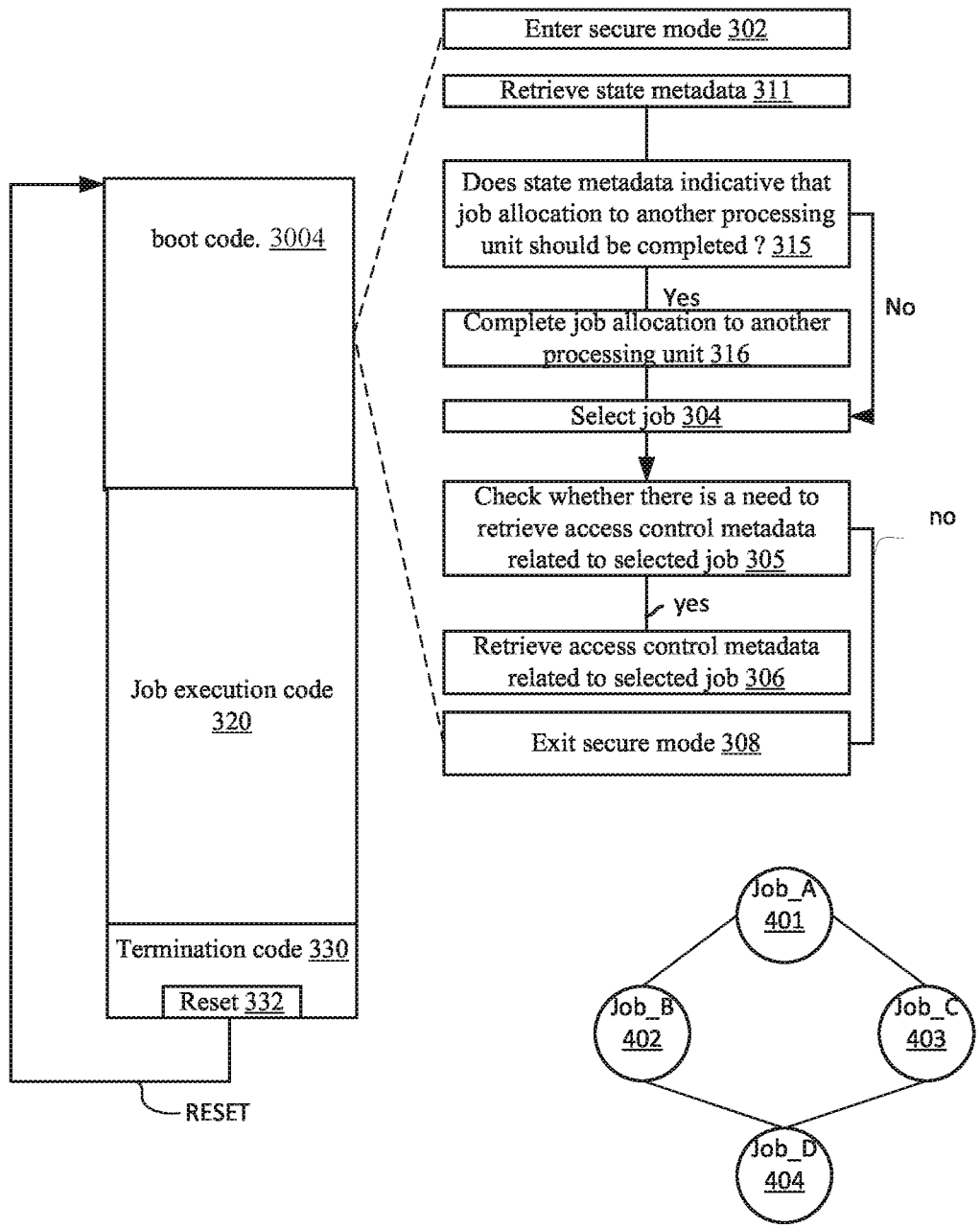
FIG. 9 is an example of a control firmware executed by a processing unit.
Figure 10:
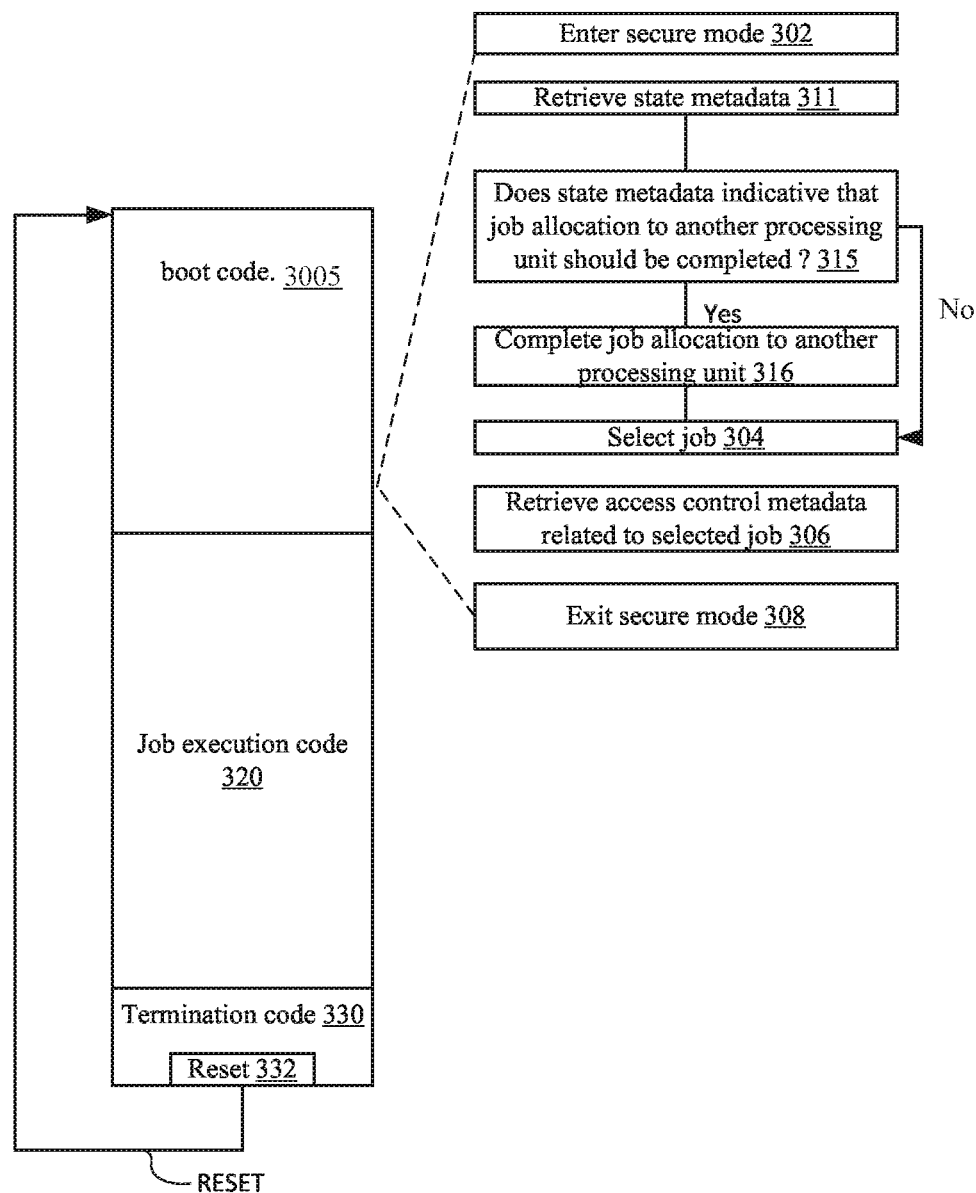
FIG. 10 is an example of a control firmware executed by a processing unit.
Figure 11:
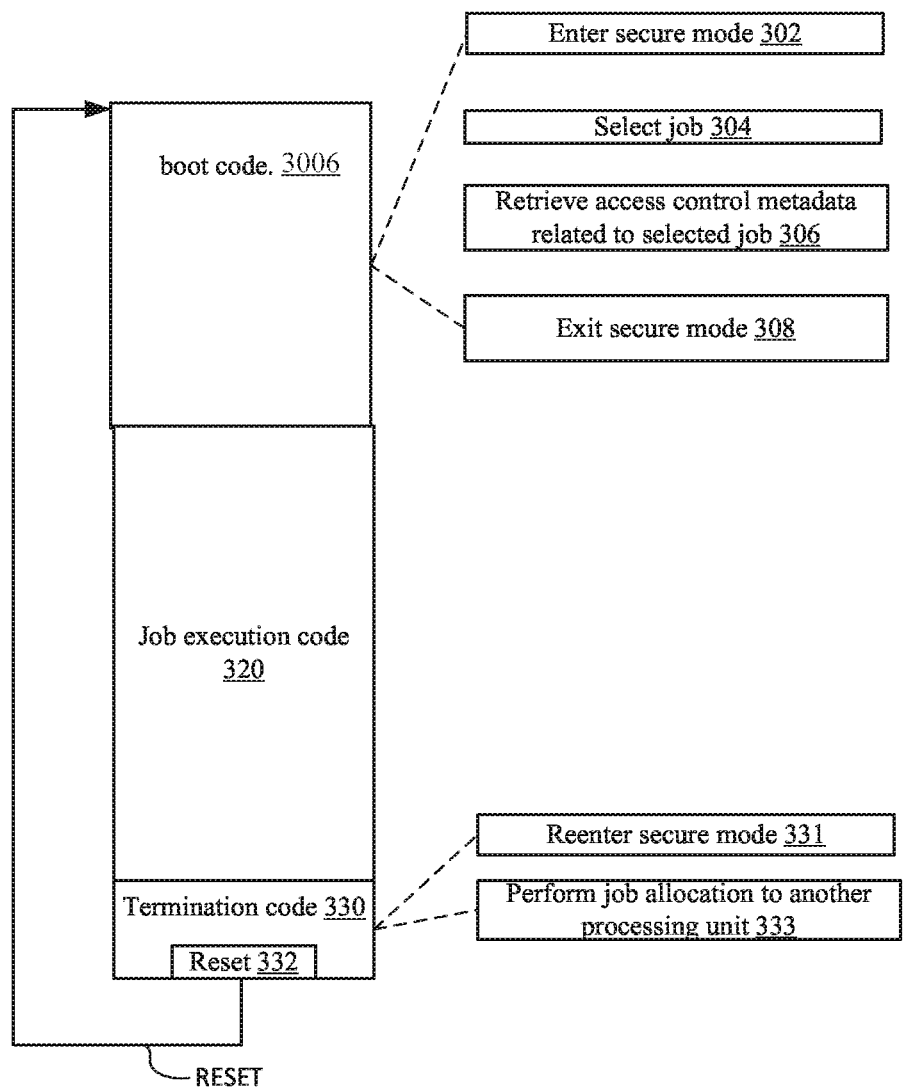
FIG. 11 is an example of a control firmware executed by a processing unit.

FIGS. 9-11 illustrate examples of CF 300(4)-300(6) that involve code for allocating a job to another processing unit. They include boot codes 3004-3006.

FIG. 9 illustrates a CF 300(4) and an example of a process that includes jobs, where some of the jobs (for example job_D 404) may be executed after a completion of other jobs (for example jobs A-C 401-403). Assuming that job_D 404 requires a different processing unit than the processing unit executing jobs B and C, the processing unit that executed jobs B and C may allocate the execution of job D to the different processing unit following a completion of jobs B and C.

CF 300(4) may start with a boot code 3004, followed by job execution code 320, and ends with a termination code 330.

The boot code 3004 may include code 302 for entering a secure mode, code 311 for retrieving state metadata, code 315 for checking if the state metadata is indicative that job allocation to another processing unit should be complete.

If so, then code 315 is followed by code 316 of completing job allocation to another processing unit (for example writing job descriptor to a queue associated with the other processing unit—may be a processing unit queue, a cluster queue, a type queue, and the like).

Else, code 315 is followed by code 304 for selecting a job, reaching code 305 for checking whether there is a need to retrieve access control metadata related to selected job.

If yes, code 305 may be following by code 306 for retrieving access control metadata related to the selected job.

If no, code 305 may be followed by jumping to code 308 for exiting the secure mode.

FIG. 10 illustrates an example of a CF 300(5) that begins with a boot code 3005, followed by job execution code 320, and ends with a termination code 330.

The boot code 3005 may include code 302 for entering a secure mode, code 311 for retrieve state metadata, code 315 for checking if the state metadata is indicative that job allocation to another processing unit should be complete.

If so, then code 315 is followed by code 316 of completing job allocation to another processing unit (for example writing job descriptor to a queue associated with the other processing unit—may be a processing unit queue, a cluster queue, a type queue, and the like).

Else, code 315 is followed by code 304 of selecting a job, code 306 of retrieving access control metadata related to the selected job, and code 308 for exiting the secure mode.

In FIG. 11 the job reallocation to another processing unit is executed by entering a secured mode following the job execution code 302 and before resetting the processing unit.

FIG. 11 illustrates an example of a CF 300(6) that begins with by a boot code 3006, followed by job execution code 320, and ends with a termination code 330.

The termination code 330 include code 331 for reentering the secure mode, and code 333 for performing job allocation to another processing unit.

Termination code 330 also includes reset code 332.

Any combination of codes may be provided.

The reset may immediately follow by the termination code or may be delayed by a certain predefined delay or adjustable delay—depending upon a definition of the reset process. The predefined delay and/or the adjustable delay may be determined in any manner.

Note that codes using the same number illustrated in FIGS. 6-11 may be the same code from figure to figure or may differ slightly but have the same or substantially similar functional ability. For example, exit secure mode code 308 may have the same code in FIGS. 6 and 7, or may be slightly different in their contents but have the same functional effect.

Figure 12:
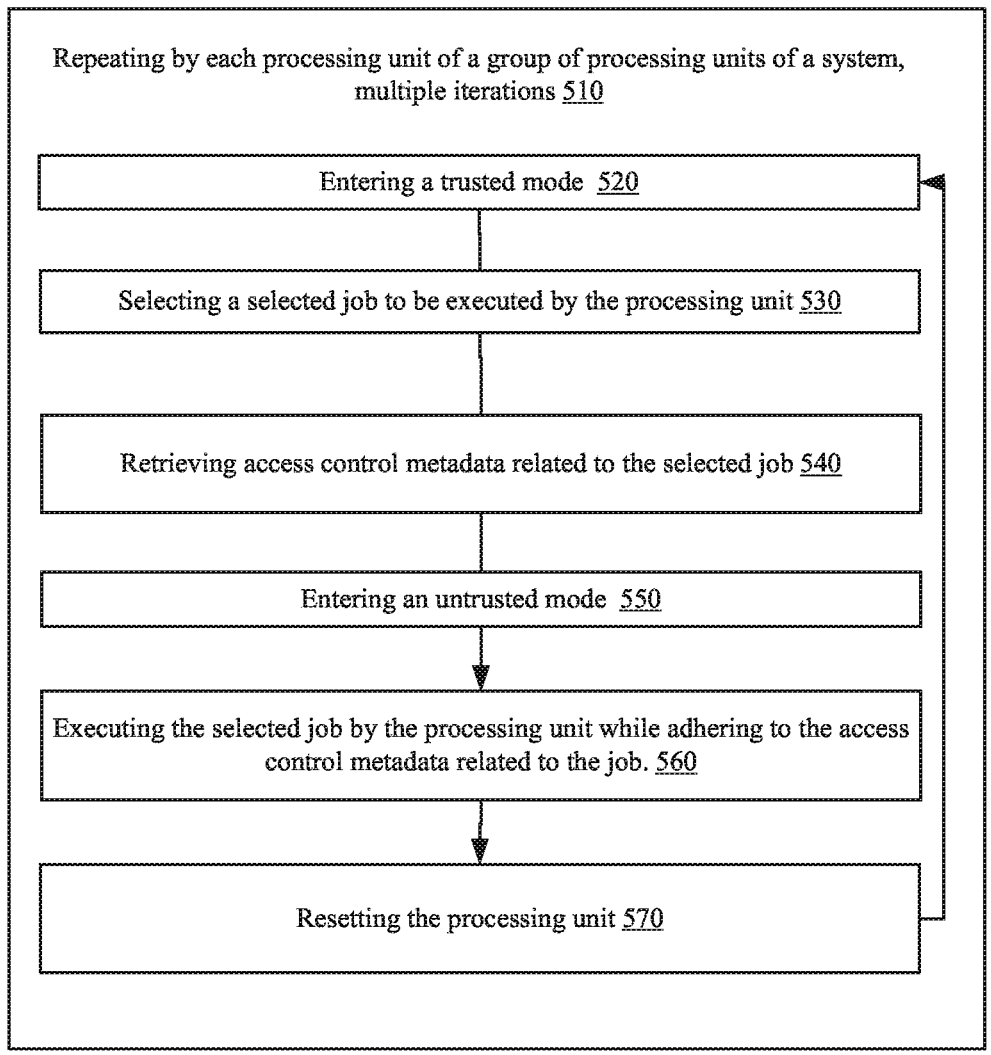
FIG. 12 illustrates an example of a method.

FIG. 12 is an example of a method 500 for job execution.

Method 500 may start by step 510 of repeating by each processing unit of a group of processing units of a system, multiple iterations that include the following steps: (a) entering a trusted mode (520), (b) selecting (530) a selected job to be executed by the processing unit, (c) retrieving (540) access control metadata related to the selected job, (d) entering (550), by the processing unit, an untrusted mode, (e) executing (560) the selected job by the processing unit while adhering to the access control metadata related to the job, (e) resetting (570) the processing unit; and (f) jumping to step 520.

The group of processing units may be all the processing units of a system (for example all 64 processing units of system 200), or may include only some of the processing units of the system.

Step 510 may be executed without intervention of the controller

At least a majority of the iterations of step 510 may be executed without interrupting a controller of the system, the controller does not belong to the group of processing units.

The step 520 may be executed during a boot process following the resetting of the processing unit.

Step 540 may include selecting the selected job out of multiple job queues. The processing units of the group may be of different types, may be arranged in clusters. The selecting of the job may include selecting a job having a job descriptor included in any one of queues allocated per a processing unit, queues allocated per type of the different types of the processing units, and queues that are allocated per cluster of the clusters.

Step 560 may include reporting a completion of the selected job.

It should be noted that step 510 may include determining by each processing unit whether there are controller defined commends to be executed and if so—executing the controller defined commands.

Figure 13:
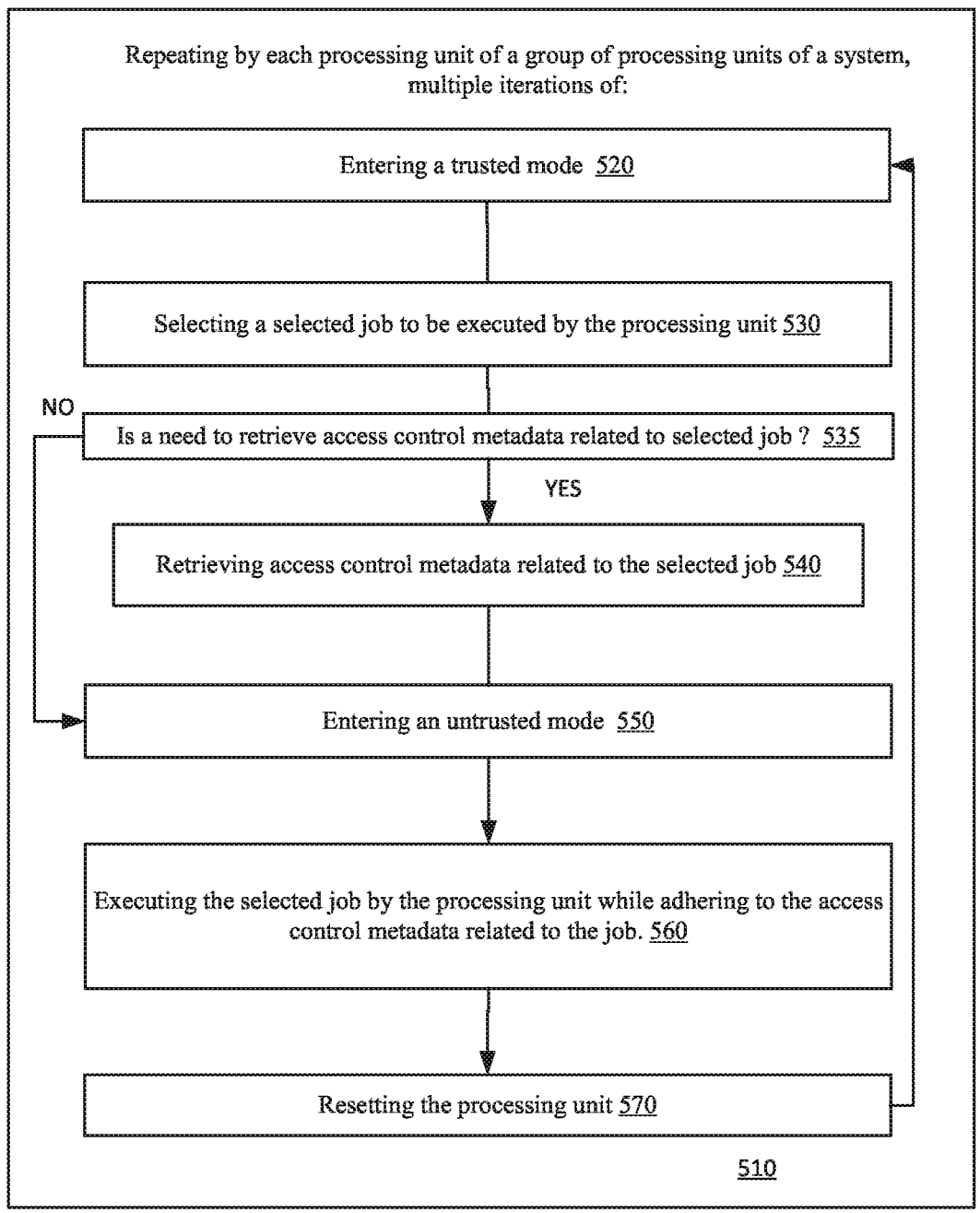
FIG. 13 illustrates an example of a method.

FIG. 13 is an example of a method 501 for job execution.

Method 501 differs from method 500 by including step 535 of checking if step 540 is required—and if not—jumping to step 550 without executing step 540. Else—executing step 540 and then step 550.

Step 560 may include storing state metadata indicative of a process that included a last job previously executed by the processing unit.

Step 535 may include determining whether the selected job belongs to the process (access control metadata of which is accessible to the processing unit). When the selected job belongs to the process then the controller may be configured to skip the retrieval of the access control metadata related to the selected job—and jumping to step 550.

Figure 14:
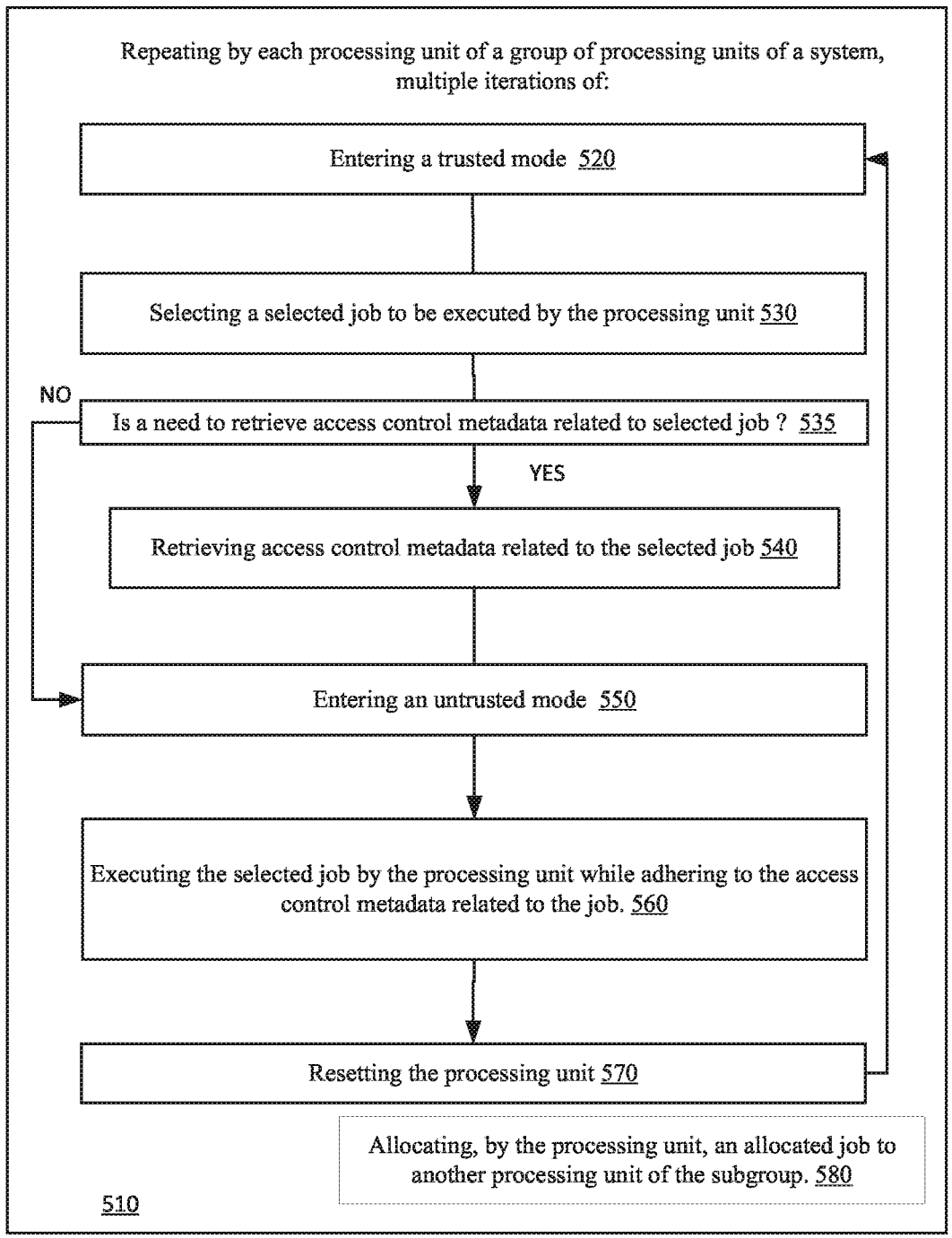
FIG. 14 illustrates an example of a method.

FIG. 14 is an example of a method 502 for job execution.

Method 502 differs from method 500 by including step 580 of reallocating, by the processing unit, an allocated job to another processing unit of the group.

The reallocation may be executed between steps 520 and 550, may be executed between steps 550 and 570, may be partially executed between steps 520 and 550 and partially executed between steps 550 and 570.

Step 580 may include executing a control firmware—for example executing any one of control firmware units 300(4)-300(6).

Step 580 may include generating or using metadata related to reallocation of the job.

The updating of the metadata may include updating a queue pointer, using an atomic command execution unit.

Step 580 may include storing state metadata indicative of a process that included a last job previously executed by the processing unit. The selection of the selected job may be followed by determining whether the selected job belongs to the process; wherein when the selected job belongs to the process then avoiding the retrieval of the access control metadata related to the selected job.

In another embodiment, a method includes performing by a processing unit of a group of processing units of a system, one or more iterations that comprises the steps of: (a) entering a trusted mode, (b) selecting a selected job to be executed by the processing unit, (c) retrieving access control metadata related to the selected job, (d) entering, by the processing unit, an untrusted mode, (e) executing the selected job by the processing unit while adhering to the access control metadata related to the job, and (f) resetting the processing unit; and transmitting an interrupt to a controller after the one or more iterations, the controller separate from the processing unit.

Any of the mentioned above memory or storage units may be implemented using any known technologies such as a volatile or nonvolatile memory including semiconductor-based memory units such as flash memory, EEPROM, EPROM, ROM; ferromagnetic digital memories; MRAM; volatile storage media including registers, buffers or caches, main memory, RAM, DRAM, SRAM, etc.

Any reference to any of the terms "comprise", "comprises", "comprising" "including", "may include" and "includes" may be applied to any of the terms "consists", "consisting", "and consisting essentially of". For example—any of method describing steps may include more steps than those illustrated in the figure, only the steps illustrated in the figure or substantially only the steps illustrate in the figure. The same applies to components of a device, processor or system and to instructions stored in any non-transitory computer readable storage medium.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

EXAMPLE EMBODIMENTS

Example 1 is a method for job execution, the method comprising: performing by a processing unit of a group of processing units of a system, while avoiding interrupting a controller that does not belong to the group, at least one iteration of the steps of: (a) entering a trusted mode, (b) selecting a selected job to be executed by the processing unit, (c) retrieving access control metadata related to the selected job, (d) entering, by the processing unit, an untrusted mode, (e) executing the selected job by the processing unit while adhering to the access control metadata related to the job, and (f) resetting the processing unit.

In Example 2, the subject matter of Example 1 includes, performing multiple iterations of steps (a)-(f), wherein at least a majority of the iterations are executed without interrupting the controller.

In Example 3, the subject matter of Examples 1-2 includes, wherein entering the trusted mode is executed during a boot process following the resetting of the processing unit.

In Example 4, the subject matter of Examples 1-3 includes, executing, by the processing unit, the multiple iterations without intervention of the controller.

In Example 5, the subject matter of Examples 1-4 includes, reporting a completion of the selected job.

In Example 6, the subject matter of Examples 1-5 includes, allocating, by the processing unit, an allocated job to another processing unit of the group; wherein the allocating comprises updating, by the processing unit and while in the trusted mode, metadata related to an execution of the allocated job.

In Example 7, the subject matter of Example 6 includes, wherein updating the metadata comprises updating a queue pointer, using an atomic command execution unit.

In Example 8, the subject matter of Examples 6-7 includes, wherein updating the metadata precedes resetting the processing unit.

In Example 9, the subject matter of Examples 6-8 includes, wherein updating the metadata follows resetting the processing unit.

In Example 10, the subject matter of Examples 1-9 includes, wherein selecting the selected job comprises selecting the selected job from one of multiple job queues.

In Example 11, the subject matter of Example 10 includes, wherein the group of processing units comprise different types of processing unit and are arranged in clusters; and wherein the multiple job queues comprise queues allocated per processing unit, queues allocated per type of the processing units, and queues allocated per cluster.

In Example 12, the subject matter of Example 11 includes, wherein processing units of a cluster of the clusters comprise general purpose processing units.

In Example 13, the subject matter of Examples 11-12 includes, wherein processing units of a cluster of the clusters comprise hardware accelerators.

In Example 14, the subject matter of Examples 1-13 includes, determining, by the processing unit, whether to retrieve the access control metadata related to the selected job, and retrieving access control metadata related to the selected job only when determining to retrieve the access control metadata related to the selected job.

In Example 15, the subject matter of Examples 1-14 includes, storing state metadata indicative of a process that comprises a last job previously executed by the processing unit; and wherein the selecting of the selected job is followed by determining whether the selected job belongs to the process; wherein when the selected job belongs to the process then avoiding the retrieval of the access control metadata related to the selected job.

In Example 16, the subject matter of Examples 1-15 includes, retrieving, by the processing unit and while in the trusted mode, a command originated from the controller; and executing the commands by the processing unit.

Example 17 is a processing unit, the processing unit one of a group of processing units of a system, the processing unit comprising: a processor; and memory including instructions, which when executed by the processor while avoiding interrupting a controller that does not belong to the group of processing units, cause the processor to: perform at least one iteration of the steps of: (a) entering a trusted mode, (b) selecting a selected job to be executed by the processing unit, (c) retrieving access control metadata related to the selected job, (d) entering, by the processing unit, an untrusted mode, (e) executing the selected job by the processing unit while adhering to the access control metadata related to the job, and (f) resetting the processing unit.

In Example 18, the subject matter of Example 17 includes, wherein the instructions cause the processor to perform multiple iterations of steps (a)-(f), wherein at least a majority of the iterations are executed without interrupting the controller.

In Example 19, the subject matter of Examples 17-18 includes, wherein entering the trusted mode is executed during a boot process following the resetting of the processing unit.

In Example 20, the subject matter of Examples 17-19 includes, wherein the instructions cause the processor to execute, by the processing unit, the multiple iterations without intervention of the controller.

In Example 21, the subject matter of Examples 17-20 includes, wherein the instructions cause the processor to report a completion of the selected job.

In Example 22, the subject matter of Examples 17-21 includes, wherein the instructions cause the processor to allocate, by the processing unit, an allocated job to another processing unit of the group; wherein the allocating comprises updating, by the processing unit and while in the trusted mode, metadata related to an execution of the allocated job.

In Example 23, the subject matter of Example 22 includes, wherein updating the metadata comprises updating a queue pointer, using an atomic command execution unit.

In Example 24, the subject matter of Examples 22-23 includes, wherein updating the metadata precedes resetting the processing unit.

In Example 25, the subject matter of Examples 22-24 includes, wherein updating the metadata follows resetting the processing unit.

In Example 26, the subject matter of Examples 17-25 includes, wherein selecting the selected job comprises selecting the selected job from one of multiple job queues.

In Example 27, the subject matter of Example 26 includes, wherein the group of processing units comprise different types of processing unit and are arranged in clusters; and wherein the multiple job queues comprise queues allocated per processing unit, queues allocated per type of the processing units, and queues allocated per cluster.

In Example 28, the subject matter of Example 27 includes, wherein processing units of a cluster of the clusters comprise general purpose processing units.

In Example 29, the subject matter of Examples 27-28 includes, wherein processing units of a cluster of the clusters comprise hardware accelerators.

In Example 30, the subject matter of Examples 17-29 includes, wherein the instructions cause the processor to determine, by the processing unit, whether to retrieve the access control metadata related to the selected job, and retrieving access control metadata related to the selected job only when determining to retrieve the access control metadata related to the selected job.

In Example 31, the subject matter of Examples 17-30 includes, wherein the instructions cause the processor to store state metadata indicative of a process that comprises a last job previously executed by the processing unit; and wherein the selecting of the selected job is followed by determining whether the selected job belongs to the process; wherein when the selected job belongs to the process then avoiding the retrieval of the access control metadata related to the selected job.

In Example 32, the subject matter of Examples 17-31 includes, wherein the instructions cause the processor to: retrieve, by the processing unit and while in the trusted mode, a command originated from the controller; and execute the commands by the processing unit.

Example 33 is a machine-readable medium including instructions, which when executed by a processing unit of a group of processing units, cause the processing unit to perform operations while avoiding interrupting a controller that does not belong to the group of processing units, cause the processor to: perform at least one iteration of the steps of: (a) entering a trusted mode, (b) selecting a selected job to be executed by the processing unit, (c) retrieving access control metadata related to the selected job, (d) entering, by the processing unit, an untrusted mode, (e) executing the selected job by the processing unit while adhering to the access control metadata related to the job, and (f) resetting the processing unit.

In Example 34, the subject matter of Example 33 includes, performing multiple iterations of steps (a)-(f), wherein at least a majority of the iterations are executed without interrupting the controller.

In Example 35, the subject matter of Examples 33-34 includes, wherein entering the trusted mode is executed during a boot process following the resetting of the processing unit.

In Example 36, the subject matter of Examples 33-35 includes, executing, by the processing unit, the multiple iterations without intervention of the controller.

In Example 37, the subject matter of Examples 33-36 includes, reporting a completion of the selected job.

In Example 38, the subject matter of Examples 33-37 includes, allocating, by the processing unit, an allocated job to another processing unit of the group; wherein the allocating comprises updating, by the processing unit and while in the trusted mode, metadata related to an execution of the allocated job.

In Example 39, the subject matter of Example 38 includes, wherein updating the metadata comprises updating a queue pointer, using an atomic command execution unit.

In Example 40, the subject matter of Examples 38-39 includes, wherein updating the metadata precedes resetting the processing unit.

In Example 41, the subject matter of Examples 38-40 includes, wherein updating the metadata follows resetting the processing unit.

In Example 42, the subject matter of Examples 33-41 includes, wherein selecting the selected job comprises selecting the selected job from one of multiple job queues.

In Example 43, the subject matter of Example 42 includes, wherein the group of processing units comprise different types of processing unit and are arranged in clusters; and wherein the multiple job queues comprise queues allocated per processing unit, queues allocated per type of the processing units, and queues allocated per cluster.

In Example 44, the subject matter of Example 43 includes, wherein processing units of a cluster of the clusters comprise general purpose processing units.

In Example 45, the subject matter of Examples 43-44 includes, wherein processing units of a cluster of the clusters comprise hardware accelerators.

In Example 46, the subject matter of Examples 33-45 includes, determining, by the processing unit, whether to retrieve the access control metadata related to the selected job, and retrieving access control metadata related to the selected job only when determining to retrieve the access control metadata related to the selected job.

In Example 47, the subject matter of Examples 33-46 includes, storing state metadata indicative of a process that comprises a last job previously executed by the processing unit; and wherein the selecting of the selected job is followed by determining whether the selected job belongs to the process; wherein when the selected job belongs to the process then avoiding the retrieval of the access control metadata related to the selected job.

In Example 48, the subject matter of Examples 33-47 includes, retrieving, by the processing unit and while in the trusted mode, a command originated from the controller; and executing the commands by the processing unit.

Example 49 is an apparatus for job execution, the apparatus comprising: means for performing by a processing unit of a group of processing units of a system, while avoiding interrupting a controller that does not belong to the group, at least one iteration of the steps of: (a) entering a trusted mode, (b) selecting a selected job to be executed by the processing unit, (c) retrieving access control metadata related to the selected job, (d) entering, by the processing unit, an untrusted mode, (e) executing the selected job by the processing unit while adhering to the access control metadata related to the job, and (f) resetting the processing unit.

In Example 50, the subject matter of Example 49 includes, means for performing multiple iterations of steps (a)-(f), wherein at least a majority of the iterations are executed without interrupting the controller.

In Example 51, the subject matter of Examples 49-50 includes, wherein the means for entering the trusted mode is executed during a boot process following the resetting of the processing unit.

In Example 52, the subject matter of Examples 49-51 includes, means for executing, by the processing unit, the multiple iterations without intervention of the controller.

In Example 53, the subject matter of Examples 49-52 includes, means for reporting a completion of the selected job.

In Example 54, the subject matter of Examples 49-53 includes, means for allocating, by the processing unit, an allocated job to another processing unit of the group; wherein the allocating comprises updating, by the processing unit and while in the trusted mode, metadata related to an execution of the allocated job.

In Example 55, the subject matter of Example 54 includes, wherein means for updating the metadata comprises updating a queue pointer, using an atomic command execution unit.

In Example 56, the subject matter of Examples 54-55 includes, wherein means for updating the metadata precedes resetting the processing unit.

In Example 57, the subject matter of Examples 54-56 includes, wherein means for updating the metadata follows resetting the processing unit.

In Example 58, the subject matter of Examples 49-57 includes, wherein means for selecting the selected job comprises selecting the selected job from one of multiple job queues.

In Example 59, the subject matter of Example 58 includes, wherein the group of processing units comprise different types of processing unit and are arranged in clusters; and wherein the multiple job queues comprise queues allocated per processing unit, queues allocated per type of the processing units, and queues allocated per cluster.

In Example 60, the subject matter of Example 59 includes, wherein processing units of a cluster of the clusters comprise general purpose processing units.

In Example 61, the subject matter of Examples 59-60 includes, wherein processing units of a cluster of the clusters comprise hardware accelerators.

In Example 62, the subject matter of Examples 49-61 includes, determining, by the processing unit, whether to retrieve the access control metadata related to the selected job, and retrieving access control metadata related to the selected job only when determining to retrieve the access control metadata related to the selected job.

In Example 63, the subject matter of Examples 49-62 includes, means for storing state metadata indicative of a process that comprises a last job previously executed by the processing unit; and wherein the selecting of the selected job is followed by determining whether the selected job belongs to the process; wherein when the selected job belongs to the process then avoiding the retrieval of the access control metadata related to the selected job.

In Example 64, the subject matter of Examples 49-63 includes, means for retrieving, by the processing unit and while in the trusted mode, a command originated from the controller; and means for executing the commands by the processing unit.

Example 65 is at least one machine-readable medium including instructions that, when executed by processing circuitry, cause the processing circuitry to perform operations to implement of any of Examples 1-64.

Example 66 is an apparatus comprising means to implement of any of Examples 1-64.

Example 67 is a system to implement of any of Examples 1-64.

Example 68 is a method to implement of any of Examples 1-64.

We claim:

1. A method for job execution, comprising: performing by a processing unit of a group of processing units of a system, while avoiding interrupting a controller that does not belong to the group, at least one iteration of: (a) entering a trusted mode, (b) selecting a selected job to be executed by the processing unit, (c) retrieving access control metadata related to the selected job, (d) entering, by the processing unit, an untrusted mode, (e) executing the selected job by the processing unit while adhering to the access control metadata related to the job, and (f) resetting the processing unit.

2. The method according to claim 1, comprising performing multiple iterations of (a)-(f), wherein at least a majority of the iterations are executed without interrupting the controller.

3. The method according to claim 1, wherein entering the trusted mode is executed during a boot process following the resetting of the processing unit.

4. The method according to claim 1, comprising executing, by the processing unit, the multiple iterations without intervention of the controller.

5. The method according to claim 1, comprising reporting a completion of the selected job.

6. The method according to claim 1, comprising allocating, by the processing unit, an allocated job to another processing unit of the group; wherein the allocating comprises updating, by the processing unit and while in the trusted mode, metadata related to an execution of the allocated job.

7. The method according to claim 6, wherein updating the metadata comprises updating a queue pointer, using an atomic command execution unit.

8. The method according to claim 6, wherein updating the metadata precedes resetting the processing unit.

9. The method according to claim 6, wherein updating the metadata follows resetting the processing unit.

10. The method according to claim 1, wherein selecting the selected job comprises selecting the selected job from one of multiple job queues.

11. The method according to claim 10, wherein the group of processing units comprise different types of processing unit and are arranged in clusters; and wherein the multiple job queues comprise queues allocated per processing unit, queues allocated per type of the processing units, and queues allocated per cluster.

12. The method according to claim 11, wherein processing units of a cluster of the clusters comprise general purpose processing units.

13. The method according to claim 11, wherein processing units of a cluster of the clusters comprise hardware accelerators.

14. The method according to claim 1 comprising determining, by the processing unit, whether to retrieve the access control metadata related to the selected job, and retrieving access control metadata related to the selected job only when determining to retrieve the access control metadata related to the selected job.

15. The method according to claim 1, comprising storing state metadata indicative of a process that comprises a last job previously executed by the processing unit; and wherein the selecting of the selected job is followed by determining whether the selected job belongs to the process; wherein when the selected job belongs to the process then avoiding the retrieval of the access control metadata related to the selected job.

16. The method according to claim 1, comprising:
retrieving, by the processing unit and while in the trusted mode, a command originated from the controller; and
executing the commands by the processing unit.

17. A processing unit, the processing unit one of a group of processing units of a system, the processing unit comprising: a processor; and memory including instructions, which when executed by the processor while avoiding interrupting a controller that does not belong to the group of processing units, cause the processor to: perform at least one iteration of: (a) entering a trusted mode, (b) selecting a selected job to be executed by the processing unit, (c) retrieving access control metadata related to the selected job, (d) entering, by the processing unit, an untrusted mode, (e) executing the selected job by the processing unit while adhering to the access control metadata related to the job, and (f) resetting the processing unit.

18. The processing unit according to claim 17, wherein the instructions cause the processor to perform multiple iterations of (a)-(f), wherein at least a majority of the iterations are executed without interrupting the controller.

19. The processing unit according to claim 17, wherein entering the trusted mode is executed during a boot process following the resetting of the processing unit.

20. The processing unit according to claim 17, wherein the instructions cause the processor to execute, by the processing unit, the multiple iterations without intervention of the controller.

21. The processing unit according to claim 17, wherein the instructions cause the processor to report a completion of the selected job.

22. The processing unit according to claim 17, wherein the instructions cause the processor to allocate, by the processing unit, an allocated job to another processing unit of the group; wherein the allocating comprises updating, by the processing unit and while in the trusted mode, metadata related to an execution of the allocated job.

23. The processing unit according to claim 22, wherein updating the metadata comprises updating a queue pointer, using an atomic command execution unit.

24. The processing unit according to claim 22, wherein updating the metadata precedes resetting the processing unit.

25. A non-transitory machine-readable medium including instructions, which when executed by a processing unit of a group of processing units, cause the processing unit to perform operations while avoiding interrupting a controller that does not belong to the group of processing units, cause the processing unit to: perform at least one iteration of: (a) entering a trusted mode, (b) selecting a selected job to be executed by the processing unit, (c) retrieving access control metadata related to the selected job, (d) entering, by the processing unit, an untrusted mode, (e) executing the selected job by the processing unit while adhering to the access control metadata related to the job, and (f) resetting the processing unit.

* * * * *